United States Patent
Liga et al.

(10) Patent No.: US 7,930,716 B2
(45) Date of Patent: Apr. 19, 2011

(54) TECHNIQUES FOR REINSERTION OF LOCAL MARKET ADVERTISING IN DIGITAL VIDEO FROM A BYPASS SOURCE

(75) Inventors: Kevin Liga, Rye Brook, NY (US); Frank P. Deo, Kendall Park, NJ (US)

(73) Assignee: ACTV Inc., San Francisco, CA (US)

( * ) Notice: Subject to any disclaimer, the term of this patent is extended or adjusted under 35 U.S.C. 154(b) by 1579 days.

(21) Appl. No.: 10/334,406

(22) Filed: Dec. 31, 2002

(65) Prior Publication Data

US 2004/0128682 A1 Jul. 1, 2004

(51) Int. Cl.
*H04N 7/10* (2006.01)
*H04N 7/025* (2006.01)

(52) U.S. Cl. .............. 725/36; 725/32; 725/35
(58) Field of Classification Search ........... 725/32–36
See application file for complete search history.

(56) References Cited

U.S. PATENT DOCUMENTS

| | | | |
|---|---|---|---|
| 4,572,509 A | 2/1986 | Sitrick | |
| 4,592,546 A | 6/1986 | Fascenda et al. | |
| 4,602,279 A | 7/1986 | Freeman et al. | |
| 4,734,764 A | 3/1988 | Pocock et al. | |
| 4,877,408 A | 10/1989 | Hartsfield | |
| 4,894,789 A | 1/1990 | Yee | |
| 4,905,094 A | 2/1990 | Pocock et al. | |
| 4,931,865 A | 6/1990 | Scarampi | |
| 4,941,040 A | 7/1990 | Pocock et al. | |
| 5,014,125 A | 5/1991 | Pocock et al. | |
| 5,114,155 A | 5/1992 | Tillery et al. | |
| 5,128,752 A | 7/1992 | Von Kohorn | |
| 5,140,419 A | 8/1992 | Galumbeck et al. | |
| 5,191,410 A * | 3/1993 | McCalley et al. | 725/114 |
| 5,208,659 A | 5/1993 | Rhodes | |
| 5,243,528 A | 9/1993 | Lefebvre | |
| 5,262,860 A | 11/1993 | Fitzpatrick et al. | |
| 5,264,933 A | 11/1993 | Rosser et al. | |
| 5,282,028 A | 1/1994 | Johnson et al. | |

(Continued)

FOREIGN PATENT DOCUMENTS

AU 717399 8/1997

(Continued)

OTHER PUBLICATIONS

Eitz, "Combiners for Videotext Signals" Broadcast Technology Reports, translation of vol. 28, No. 6, Nov. 1984, pp. 273-289, XP002182048, Norderstedt, Germany.
"Advanced Television Enhancement Forum Specification (ATVEF)", Comment Draft Version 1.0r1, Feb. 25, 1999, XP002142688.
Dale Cripps, "Web TV over Digital Cable," May 4, 1998; http://web-star.com/hdtvnews/webtvoverdigitalcable.html; pp. 1-4.
Dale Cripps, "Internet TV Advertising," May 8, 1998; http://web-star.com/hdtvnews/internettvadvertising.html; pp. 1-3.

(Continued)

*Primary Examiner* — Brian T Pendleton
*Assistant Examiner* — Jonathan Lewis
(74) *Attorney, Agent, or Firm* — Schwegman, Lundberg & Woessner, P.A.

(57) ABSTRACT

A method and system for reinserting local content commercials in a digital video format into a customized event data stream. Local content commercials may be inserted at an on-site facility, a national network, a headend, or a local affiliate. Local content commercials may be inserted into the overall data stream, or into one of a plurality of program signals comprising the data stream. Further, markers or software instructions may be inserted into the data stream or program signals instructing a headend, set top box, or personal video recorder to retrieve a stored local content commercial and insert the commercial into the data stream.

26 Claims, 11 Drawing Sheets

U.S. PATENT DOCUMENTS

| | | |
|---|---|---|
| 5,285,278 A | 2/1994 | Holman |
| 5,291,486 A | 3/1994 | Koyanagi |
| 5,353,283 A | 10/1994 | Tsuchiya |
| 5,359,510 A | 10/1994 | Sabaliauskas |
| 5,365,346 A | 11/1994 | Abumi |
| 5,438,355 A | 8/1995 | Palmer |
| 5,453,794 A | 9/1995 | Ezaki |
| 5,462,275 A | 10/1995 | Lowe et al. |
| 5,479,268 A | 12/1995 | Young et al. |
| 5,481,542 A | 1/1996 | Logston et al. |
| 5,498,000 A | 3/1996 | Cuneo |
| 5,526,035 A | 6/1996 | Lappington et al. |
| 5,534,913 A | 7/1996 | Majeti et al. |
| 5,537,141 A | 7/1996 | Harper et al. |
| 5,539,471 A | 7/1996 | Myhrvold et al. |
| 5,543,849 A | 8/1996 | Long |
| 5,553,221 A | 9/1996 | Reimer et al. |
| 5,557,316 A | 9/1996 | Hoarty et al. |
| 5,564,073 A | 10/1996 | Takahisa |
| 5,568,390 A | 10/1996 | Hirota et al. |
| 5,570,295 A | 10/1996 | Isenberg et al. |
| 5,572,442 A | 11/1996 | Schulhof et al. |
| 5,579,055 A | 11/1996 | Hamilton et al. |
| 5,585,858 A | 12/1996 | Harper et al. |
| 5,586,257 A | 12/1996 | Perlman |
| 5,586,937 A | 12/1996 | Menashe |
| 5,589,892 A | 12/1996 | Knee et al. |
| 5,593,349 A | 1/1997 | Miguel et al. |
| 5,600,364 A | 2/1997 | Hendricks et al. |
| 5,603,078 A | 2/1997 | Henderson et al. |
| 5,604,542 A | 2/1997 | Dedrick |
| 5,610,653 A | 3/1997 | Abecassis |
| 5,612,730 A | 3/1997 | Lewis |
| RE35,498 E | 4/1997 | Barnard |
| 5,619,249 A | 4/1997 | Billock et al. |
| 5,627,978 A | 5/1997 | Altom et al. |
| 5,633,810 A | 5/1997 | Mandal et al. |
| 5,633,918 A | 5/1997 | Mankovitz |
| 5,636,346 A * | 6/1997 | Saxe .................... 705/1.1 |
| 5,637,844 A | 6/1997 | Eiba |
| 5,640,193 A | 6/1997 | Wellner |
| 5,643,088 A | 7/1997 | Vaughn et al. |
| 5,649,284 A | 7/1997 | Yoshinobu |
| 5,659,366 A | 8/1997 | Kerman |
| 5,667,708 A | 9/1997 | Glass et al. |
| 5,668,592 A | 9/1997 | Spaulding, II |
| 5,677,708 A | 10/1997 | Matthews, III et al. |
| 5,679,075 A | 10/1997 | Forrest et al. |
| 5,686,954 A | 11/1997 | Yoshinobu et al. |
| 5,691,986 A | 11/1997 | Pearlstein |
| 5,694,163 A | 12/1997 | Harrison |
| 5,695,400 A | 12/1997 | Fennell, Jr. et al. |
| 5,696,905 A | 12/1997 | Reimer et al. |
| 5,697,844 A | 12/1997 | Von Kohorn |
| 5,710,884 A | 1/1998 | Dedrick |
| 5,724,091 A | 3/1998 | Freeman et al. |
| 5,724,103 A | 3/1998 | Batchelor |
| 5,724,521 A | 3/1998 | Dedrick |
| 5,724,567 A | 3/1998 | Rose et al. |
| 5,729,252 A | 3/1998 | Fraser |
| 5,730,654 A | 3/1998 | Brown |
| 5,734,413 A | 3/1998 | Lappington et al. |
| 5,734,437 A | 3/1998 | Back |
| 5,748,186 A | 5/1998 | Raman |
| 5,748,731 A | 5/1998 | Shephard |
| 5,757,916 A | 5/1998 | MacDoran et al. |
| 5,758,079 A | 5/1998 | Ludwig et al. |
| 5,759,101 A | 6/1998 | Von Kohorn |
| 5,761,602 A | 6/1998 | Wagner et al. |
| 5,761,606 A | 6/1998 | Wolzien |
| 5,771,307 A | 6/1998 | Lu et al. |
| 5,771,381 A | 6/1998 | Jones et al. |
| 5,774,664 A | 6/1998 | Hidary et al. |
| 5,778,181 A | 7/1998 | Hidary et al. |
| 5,779,549 A | 7/1998 | Walker et al. |
| 5,782,692 A | 7/1998 | Stelovsky |
| 5,793,365 A | 8/1998 | Tang et al. |
| 5,796,393 A | 8/1998 | MacNaughton et al. |
| 5,796,952 A | 8/1998 | Davis et al. |
| 5,798,785 A | 8/1998 | Hendricks et al. |
| 5,801,750 A | 9/1998 | Kurihara |
| 5,813,006 A | 9/1998 | Polnerow et al. |
| 5,818,441 A | 10/1998 | Throckmorton et al. |
| 5,819,261 A | 10/1998 | Takahashi et al. |
| 5,823,879 A | 10/1998 | Goldberg et al. |
| 5,832,496 A | 11/1998 | Anand et al. |
| 5,846,132 A | 12/1998 | Junkin |
| 5,848,373 A | 12/1998 | DeLorme et al. |
| 5,848,396 A | 12/1998 | Gerace |
| 5,848,397 A | 12/1998 | Marsh et al. |
| 5,855,516 A | 1/1999 | Eiba |
| 5,861,881 A | 1/1999 | Freeman et al. |
| 5,867,208 A | 2/1999 | McLaren |
| 5,870,558 A | 2/1999 | Branton, Jr. et al. |
| 5,878,222 A | 3/1999 | Harrison |
| 5,878,223 A | 3/1999 | Becker et al. |
| 5,880,720 A | 3/1999 | Iwafune et al. |
| 5,889,950 A | 3/1999 | Kuzma |
| 5,889,951 A | 3/1999 | Lombardi |
| 5,890,906 A | 4/1999 | Macri et al. |
| 5,890,963 A | 4/1999 | Yen |
| 5,892,535 A * | 4/1999 | Allen et al. .................... 725/36 |
| 5,892,909 A | 4/1999 | Grasso et al. |
| 5,894,556 A | 4/1999 | Grimm et al. |
| 5,905,865 A | 5/1999 | Palmer et al. |
| 5,907,322 A | 5/1999 | Kelly et al. |
| 5,907,680 A | 5/1999 | Nielsen |
| 5,912,700 A | 6/1999 | Honey et al. |
| 5,913,040 A | 6/1999 | Rakavy et al. |
| 5,917,725 A | 6/1999 | Thacher et al. |
| 5,918,009 A | 6/1999 | Gehani et al. |
| 5,918,014 A | 6/1999 | Robinson |
| 5,920,856 A | 7/1999 | Syeda-Mahmood |
| 5,926,179 A | 7/1999 | Matsuda et al. |
| 5,929,849 A | 7/1999 | Kikinis |
| 5,929,850 A | 7/1999 | Broadwin et al. |
| 5,933,822 A | 8/1999 | Branden-Harder et al. |
| 5,940,082 A | 8/1999 | Brinegar et al. |
| 5,940,595 A | 8/1999 | Reber et al. |
| 5,941,774 A | 8/1999 | Takemoto et al. |
| 5,946,664 A | 8/1999 | Ebisawa et al. |
| 5,947,747 A | 9/1999 | Walker et al. |
| 5,948,040 A | 9/1999 | DeLorme et al. |
| 5,951,636 A | 9/1999 | Zerber |
| 5,954,798 A | 9/1999 | Shelton et al. |
| 5,956,038 A | 9/1999 | Rekimoto |
| 5,961,603 A | 10/1999 | Kunkel et al. |
| 5,973,685 A | 10/1999 | Schaffa et al. |
| 5,978,833 A | 11/1999 | Pashley et al. |
| 5,987,454 A | 11/1999 | Hobbs |
| 5,987,523 A | 11/1999 | Hind et al. |
| 5,999,664 A | 12/1999 | Mahoney et al. |
| 5,999,929 A | 12/1999 | Goodman |
| 6,002,393 A * | 12/1999 | Hite et al. .................... 715/719 |
| 6,002,394 A | 12/1999 | Schein et al. |
| 6,005,561 A | 12/1999 | Hawkins et al. |
| 6,006,252 A | 12/1999 | Wolfe |
| 6,006,256 A | 12/1999 | Zdepski et al. |
| 6,006,265 A * | 12/1999 | Rangan et al. .................... 709/226 |
| 6,009,458 A | 12/1999 | Hawkins et al. |
| 6,012,083 A | 1/2000 | Savitzky et al. |
| 6,018,768 A | 1/2000 | Ullman et al. |
| 6,023,729 A | 2/2000 | Samuel et al. |
| 6,026,375 A | 2/2000 | Hall et al. |
| 6,029,045 A | 2/2000 | Picco et al. |
| 6,029,172 A | 2/2000 | Jorna et al. |
| 6,029,195 A | 2/2000 | Herz |
| 6,044,403 A | 3/2000 | Gerszberg et al. |
| 6,047,235 A | 4/2000 | Hiyokawa et al. |
| 6,049,821 A | 4/2000 | Theriault et al. |
| 6,055,569 A | 4/2000 | O'Brien |
| 6,057,856 A | 5/2000 | Miyashita et al. |
| 6,058,430 A | 5/2000 | Kaplan |
| 6,061,738 A | 5/2000 | Osaku et al. |
| 6,064,438 A | 5/2000 | Miller |
| 6,065,059 A | 5/2000 | Shieh et al. |
| 6,075,527 A | 6/2000 | Ichihashi et al. |

| | | |
|---|---|---|
| 6,076,072 A | 6/2000 | Libman |
| 6,080,063 A | 6/2000 | Khosla |
| 6,081,830 A | 6/2000 | Schindler |
| 6,082,887 A | 7/2000 | Feuer et al. |
| 6,094,677 A | 7/2000 | Capek et al. |
| 6,098,085 A | 8/2000 | Blonder et al. |
| 6,101,180 A | 8/2000 | Donahue et al. |
| 6,102,797 A | 8/2000 | Kail |
| 6,102,969 A | 8/2000 | Christianson et al. |
| 6,108,703 A | 8/2000 | Leighton et al. |
| 6,112,181 A | 8/2000 | Shear et al. |
| 6,112,212 A | 8/2000 | Heitler |
| 6,119,165 A | 9/2000 | Li et al. |
| 6,122,647 A | 9/2000 | Horowitz et al. |
| 6,122,658 A | 9/2000 | Chaddha |
| 6,126,547 A | 10/2000 | Ishimoto et al. |
| 6,128,482 A | 10/2000 | Nixon et al. |
| 6,131,120 A | 10/2000 | Reid |
| 6,134,584 A | 10/2000 | Chang et al. |
| 6,138,144 A | 10/2000 | DeSimone et al. |
| 6,141,010 A | 10/2000 | Hoyle |
| 6,144,848 A | 11/2000 | Walsh et al. |
| 6,144,991 A | 11/2000 | England |
| 6,151,626 A | 11/2000 | Tims et al. |
| 6,163,803 A | 12/2000 | Watanabe |
| 6,173,317 B1 | 1/2001 | Chaddha et al. |
| 6,177,931 B1 | 1/2001 | Alexander et al. |
| 6,182,072 B1 | 1/2001 | Leak et al. |
| 6,182,116 B1 | 1/2001 | Namma et al. |
| 6,192,340 B1 | 2/2001 | Abecassis |
| 6,193,610 B1 | 2/2001 | Junkin |
| 6,195,680 B1 | 2/2001 | Goldszmidt et al. |
| 6,199,045 B1 | 3/2001 | Giniger et al. |
| 6,204,842 B1 | 3/2001 | Fujii |
| 6,205,582 B1 | 3/2001 | Hoarty |
| 6,239,797 B1 | 5/2001 | Hills et al. |
| 6,240,183 B1 | 5/2001 | Marchant |
| 6,253,228 B1 | 6/2001 | Ferris et al. |
| 6,260,192 B1 | 7/2001 | Rosin et al. |
| 6,263,505 B1 | 7/2001 | Walker et al. |
| 6,266,649 B1 | 7/2001 | Linden et al. |
| 6,275,705 B1 | 8/2001 | Drane et al. |
| 6,278,942 B1 | 8/2001 | McDonough |
| 6,279,007 B1 | 8/2001 | Uppala |
| 6,285,407 B1 | 9/2001 | Yasuki et al. |
| 6,288,753 B1 | 9/2001 | DeNicola et al. |
| 6,289,362 B1 | 9/2001 | Van Der Meer |
| 6,292,780 B1 | 9/2001 | Doederlein et al. |
| 6,297,748 B1 | 10/2001 | Lappenbusch et al. |
| 6,298,330 B1 | 10/2001 | Gardenswartz et al. |
| 6,317,722 B1 | 11/2001 | Jacobi et al. |
| 6,317,780 B1 | 11/2001 | Cohn et al. |
| 6,317,791 B1 | 11/2001 | Cohn et al. |
| 6,326,982 B1 | 12/2001 | Wu et al. |
| 6,327,574 B1 | 12/2001 | Kramer et al. |
| 6,330,592 B1 | 12/2001 | Makuch et al. |
| 6,353,933 B1 | 3/2002 | Love |
| 6,366,914 B1 | 4/2002 | Stern |
| 6,389,458 B2 | 5/2002 | Shuster |
| 6,397,220 B1 | 5/2002 | Deisinger et al. |
| 6,401,242 B1 * | 6/2002 | Eyer et al. ............... 725/35 |
| 6,412,011 B1 | 6/2002 | Agraharam et al. |
| 6,424,979 B1 | 7/2002 | Livingston et al. |
| 6,425,012 B1 | 7/2002 | Trovato et al. |
| 6,442,590 B1 | 8/2002 | Inala et al. |
| 6,442,598 B1 | 8/2002 | Wright et al. |
| 6,442,687 B1 | 8/2002 | Savage |
| 6,456,854 B1 | 9/2002 | Chern et al. |
| 6,457,010 B1 | 9/2002 | Eldering et al. |
| 6,460,180 B1 | 10/2002 | Park et al. |
| 6,463,585 B1 * | 10/2002 | Hendricks et al. ............ 725/35 |
| 6,466,929 B1 | 10/2002 | Brown et al. |
| 6,466,969 B1 | 10/2002 | Bunney et al. |
| 6,480,885 B1 | 11/2002 | Olivier |
| 6,486,892 B1 | 11/2002 | Stern |
| RE37,957 E | 1/2003 | Garfield |
| 6,513,069 B1 | 1/2003 | Abato et al. |
| 6,526,041 B1 | 2/2003 | Shaffer et al. |
| 6,526,335 B1 | 2/2003 | Treyz et al. |
| 6,571,234 B1 | 5/2003 | Knight et al. |
| 6,577,716 B1 | 6/2003 | Minter et al. |
| 6,578,025 B1 | 6/2003 | Pollack et al. |
| 6,606,657 B1 | 8/2003 | Zilberstein et al. |
| 6,611,872 B1 | 8/2003 | McCanne |
| 6,615,408 B1 | 9/2003 | Kaiser et al. |
| 6,625,624 B1 | 9/2003 | Chen et al. |
| 6,625,647 B1 | 9/2003 | Barrick et al. |
| 6,630,963 B1 | 10/2003 | Billmaier |
| 6,643,691 B2 | 11/2003 | Austin |
| 6,661,372 B1 | 12/2003 | Girerd et al. |
| 6,698,020 B1 * | 2/2004 | Zigmond et al. ............... 725/34 |
| 6,725,159 B2 | 4/2004 | Krasner |
| 6,728,269 B1 * | 4/2004 | Godwin et al. ............... 370/477 |
| 6,760,749 B1 | 7/2004 | Dunlap et al. |
| 6,961,953 B2 * | 11/2005 | Nieminen ............... 725/23 |
| 7,757,265 B2 * | 7/2010 | Reynolds et al. ............... 725/144 |
| 2001/0000537 A1 | 4/2001 | Inala et al. |
| 2001/0003823 A1 | 6/2001 | Mighdoll et al. |
| 2001/0013123 A1 | 8/2001 | Freeman et al. |
| 2001/0054181 A1 * | 12/2001 | Corvin ............... 725/42 |
| 2002/0056129 A1 | 5/2002 | Blackketter et al. |
| 2002/0083440 A1 * | 6/2002 | Dupuis et al. ............... 725/32 |
| 2002/0112002 A1 | 8/2002 | Abato |
| 2002/0138834 A1 * | 9/2002 | Gerba et al. ............... 725/42 |
| 2002/0156909 A1 | 10/2002 | Harrington |
| 2002/0188943 A1 | 12/2002 | Freeman et al. |
| 2002/0194589 A1 | 12/2002 | Sheehan et al. |
| 2003/0039465 A1 * | 2/2003 | Bjorgan et al. ............... 386/20 |
| 2003/0066078 A1 * | 4/2003 | Bjorgan et al. ............... 725/34 |
| 2003/0106070 A1 * | 6/2003 | Saam ............... 725/135 |
| 2003/0174837 A1 * | 9/2003 | Candelore et al. ............... 380/210 |
| 2003/0213001 A1 * | 11/2003 | Yuen et al. ............... 725/136 |
| 2005/0097622 A1 | 5/2005 | Zigmond et al. |
| 2005/0102695 A1 * | 5/2005 | Musser ............... 725/34 |
| 2006/0070095 A1 * | 3/2006 | Newton et al. ............... 725/27 |
| 2007/0005795 A1 * | 1/2007 | Gonzalez ............... 709/232 |

FOREIGN PATENT DOCUMENTS

| | | |
|---|---|---|
| AU | 717399 | 7/2000 |
| DE | 44 27 046 | 2/1996 |
| DE | 44 27 046 A1 | 2/1996 |
| DE | 44 31 438 | 3/1996 |
| DE | 44 31 438 A1 | 3/1996 |
| DE | 19545882 | 6/1997 |
| EP | 0 163 577 | 12/1985 |
| EP | 0 163 577 A2 | 12/1985 |
| EP | 0 314 572 | 5/1989 |
| EP | 0 314 572 A2 | 5/1989 |
| EP | 0424648 A2 | 5/1991 |
| EP | 0 562 221 | 9/1993 |
| EP | 0 562 221 A1 | 9/1993 |
| EP | 0 673 164 | 3/1995 |
| EP | 0 673 164 A1 | 3/1995 |
| EP | 0 757 485 | 2/1997 |
| EP | 0 757 485 A2 | 2/1997 |
| EP | 0 805 598 | 11/1997 |
| EP | 0 805 598 A1 | 11/1997 |
| EP | 0 837 609 | 4/1998 |
| EP | 0 837 609 A2 | 4/1998 |
| EP | 0852443 A | 7/1998 |
| EP | 0 879 536 | 11/1998 |
| EP | 0 879 536 B1 | 11/1998 |
| EP | 0901284 A | 3/1999 |
| EP | 0915621 | 5/1999 |
| EP | 0952539 A2 | 10/1999 |
| EP | 0 982 943 A2 | 3/2000 |
| EP | 0 982 943 | 5/2000 |
| EP | 1089201 A1 | 4/2001 |
| EP | 1111914 A | 6/2001 |
| GB | 2 132 856 | 7/1984 |
| GB | 2 132 856 A | 7/1984 |
| GB | 2 325 537 | 11/1998 |
| GB | 2 325 537 A | 11/1998 |
| GB | 2 327 837 | 2/1999 |
| GB | 2 327 837 A | 2/1999 |
| GB | 2 347 055 | 8/2000 |
| GB | 2 347 055 A | 8/2000 |
| GB | 2 350 213 | 11/2000 |

| | | |
|---|---|---|
| GB | 2 350 213 A | 11/2000 |
| GB | 2356319 A | 5/2001 |
| GB | 2 359 708 | 8/2001 |
| GB | 2 359 708 A | 8/2001 |
| GB | 2 359 958 | 9/2001 |
| GB | 2 359 958 A | 9/2001 |
| JP | 4-127688 | 4/1992 |
| JP | 5176306 | 7/1993 |
| JP | 7-288606 | 10/1995 |
| JP | 7-307813 | 11/1995 |
| JP | 8-8860 | 1/1996 |
| JP | 10-222541 | 8/1998 |
| WO | WO 93/06675 | 4/1993 |
| WO | WO 93/06675 A1 | 4/1993 |
| WO | WO 93/07713 | 4/1993 |
| WO | WO 93/07713 A1 | 4/1993 |
| WO | WO 93/11617 | 6/1993 |
| WO | WO 93/11617 A1 | 6/1993 |
| WO | WO 93/22877 | 11/1993 |
| WO | WO 93/22877 A2 | 11/1993 |
| WO | WO 94/13107 | 6/1994 |
| WO | WO 94/13107 A1 | 6/1994 |
| WO | WO-96/04633 A1 | 2/1996 |
| WO | WO 96/07270 | 3/1996 |
| WO | WO 96/07270 A1 | 3/1996 |
| WO | WO 96/08923 | 3/1996 |
| WO | WO 96/08923 A1 | 3/1996 |
| WO | WO 96/13124 | 5/1996 |
| WO | WO 96/13124 A1 | 5/1996 |
| WO | WO 97/02689 | 1/1997 |
| WO | WO 97/02689 A1 | 1/1997 |
| WO | WO 97/02699 | 1/1997 |
| WO | WO 97/02699 A1 | 1/1997 |
| WO | WO 97/22207 | 6/1997 |
| WO | WO 97/22207 A1 | 6/1997 |
| WO | WO 97/27546 | 7/1997 |
| WO | WO 97/27546 A1 | 7/1997 |
| WO | WO 97/29591 | 8/1997 |
| WO | WO 97/29591 A1 | 8/1997 |
| WO | WO 97/33434 | 9/1997 |
| WO | WO 97/33434 A1 | 9/1997 |
| WO | WO-98/03016 A1 | 1/1998 |
| WO | WO-98-23080 A2 | 5/1998 |
| WO | WO-98-29956 A2 | 7/1998 |
| WO | WO-99/00163 A1 | 1/1999 |
| WO | WO-99/14930 A2 | 3/1999 |
| WO | WO-99-44159 A1 | 9/1999 |
| WO | WO 99/45726 | 9/1999 |
| WO | WO-99/45726 | 9/1999 |
| WO | WO 99/50778 | 10/1999 |
| WO | WO-99/50778 | 10/1999 |
| WO | WO-99-55066 A1 | 10/1999 |
| WO | WO 00/14987 | 3/2000 |
| WO | WO 00/14987 A1 | 3/2000 |
| WO | WO 00/36836 | 6/2000 |
| WO | WO 00/36836 A1 | 6/2000 |
| WO | WO 00/36886 | 6/2000 |
| WO | WO 00/43892 | 7/2000 |
| WO | WO 00/43892 A1 | 7/2000 |
| WO | WO 00/43899 | 7/2000 |
| WO | WO 00/43899 A1 | 7/2000 |
| WO | WO-00-045599 A | 8/2000 |
| WO | WO 00/77664 | 12/2000 |
| WO | WO 00/77664 A2 | 12/2000 |
| WO | WO-01-015357 A | 3/2001 |
| WO | WO-01/58159 | 8/2001 |
| WO | WO 02/065252 | 8/2002 |
| WO | WO 02/065252 A2 | 8/2002 |
| WO | WO 02/065318 | 8/2002 |
| WO | WO 02/065318 A2 | 8/2002 |

OTHER PUBLICATIONS

Dale Cripps, "Gates, TV, Interactivity,"May 5, 1998; pp. 1-4; http://web-star.com/hdtvnews/gatestvinteractivity.html.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

Per Einar Dybvik and Hakon W. Lie, "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.

Tak K. Woo et al., "A Synchronous Collaboration Tool for the World-Wide Web," The Second International WWW Conference '94, Mosaic and the Web, Advance Proceedings, vol. 1, Oct. 17-20, 1994, at 315.

Intercast Industry Group, Press Release, "Leaders in PC, Broadcast and Cable Industries Announce Formation of Industry Group to Promote New Digital Medium for the Home PC," Business Wire, Oct. 23, 1995.

The Intercast Industry Group, "Frequently Asked Questions," Fall 1996, pp. 1-7.

Vinay Kumar et al., "A Shared Web to Support Design Teams", Third Workshop on Enabling Technologies: Infrastructure for Collaborative Enterprises, Morgantown, West Virginia, Apr. 17-19, 1994 at 178.

Newsbytes, "Different takes on Wedding TV to Web" *NEWSBYTES, 'Online! Mar. 1, 1999*, XP002257234 Retrieved from the Internet: <URL:www.exn.ca/Stories/1999/03/01/04.asp> 'retrieved on Oct. 9, 2003! * p. 1, last paragraph*.

Kieron Murphy, "HyperTV fuses Java with television" JAVAWORLD, 'Online! May 1996, XP00257236 Retrieved from the Internet: <URL:www.javaworld.com/javaworld/jw-05-1996/jw-05-hypertv.html> 'retrieved on Oct. 9, 2003!

Yu et al., "Design and Analysis of Look Ahead Scheduling Scheme to Support Pause-Resume for Video-On-Demand Applications", Multimedia Systems, vol. 3, No. 4, Jan. 1995, pp. 137-149, XP000576898.

Sandra Beudin, "The Web is not TV, or is it?" *DZINE, 'Online! Dec. 31, 1996*, XP002257234, Retrieved from the Internet: URL:www.exn.ca/stories/1999/03/01/04.asp> retrieved on Oct. 9, 2003.

Wittig et al., "Intelligent Media Agents in Interactve Television Systems", Proceedings of the International Conference on Multimedia Computing and Systems, Los Alamitos, CA, May 15, 1995, pp. 182-189, XP000603484.

"Funkschau Fachzeitschrift für elektronische Kommunikation", vol. 6/96 of Mar. 1, 1996., pp. 70-75. and English Translation of extract from Funkschau Fachzeitschrift für elektronische Kommunikation.

Nikkei BP Corp., "Intercast Using Gap Television Signal", Nikkei Electronics, Japan, Dec. 18, 1995, No. 651, p. 106.

Television Society, "Interactive Television Broadcast Using Character Broadcast System, Video Information and Broadcast Technology", Nov. 20, 1995, vol. 11, p. 1482-1487.

Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.

Mannos, T.J., "Re: Web page prefetching?" located at <URL:http://dejanews.com> retrieved on Oct. 4, 2002, DEJA News (Online), Dec. 1, 1997.

Philippe Le Hegaret, "Document Object Module (DOM)", Architecture Domain, located at www.w3.org/DOM/ retrieved on Jun. 22, 2001, 2 pages.

S. Gillich et al., "ATVEF Integration with DVB Using IP/MPE," Dec. 20, 1999, retrieved from www.atvef.com/library/atvef-dub-bindingR8.html on Jun. 8, 2001, 5 pages.

J. Steinhom et al., "Embedded Systems Programming-Enhancing TV with ATVEF," retrieved from www.embedded.com/1999/9910/9910ial.htm on Mar. 28, 2000, 10 pages.

"Enhanced Content Specification," ATVEF, 1998, retrieved from www.atvef.com/library/spec1-la.html. on Mar. 28, 2000, 38 pages.

"RealSystem G2 Production Guide," 1998-2000, pp. 75-79.

"Overview," located at www.claria.com/companyinfo/ visited on Mar. 1, 2005.

Papadimitriou, C. H. et al. "Information Catching for Delivery of Personalized Video Programs on Home Entertainment Channels," Multimedia Computing and Systems, May 15, 1994, Proceedings of the Int'l Conference on Boston, MA, pp. 214-223.

Ramanathan, S. et al. "Architectures for Personalized Multimedia," IEEE Multimedia, Mar. 21, 1994, pp. 37-46.

Venkat, Rangan et al. "Designing an On-Demand Multimedia Service," IEEE Communications Magazine, IEEE Service Center, Jul. 1992, pp. 56-64.

Almerot Quinn "IP Multicast Applications: Challenges and Solutions," IETF Draft retrieved from the Internet: URL:http://www.cs.ucsb.edu/~almeroth/classes/S00.276/papers/McastApps.txt retrieved on Mar. 3, 2005; pp. 1-27.

Zabele Braudes "Requirements for Multicast Protocols," IETF RFC, retrieved from the Internet: URL:www.ietf.org/rfc/rfc1458.txt; May 1993, pp. 1-19.

ATNEWYORKSTAFF: "ACTV Reinvents Internet Television Service," retrieved from the Internet: URL:http://www.atnewyork.com/news/article.php/249871 retrieved on Oct. 17, 2003; 1 page.

Dale Cripps, "Gates, TV, Interactivity," May 5, 1998; pp. 1-4; http://web-star.com/hdtvnews/gatestvinteractivity.html.

Kieron Murphy, "HyperTV fuses Java with television" JAVAWORLD, 'Online! May 1996, XP00257236 Retrieved from the Internet: <URL:www.javaworld.com/javaworld/jw-05-1996/jw-05-hypertv.html> 'retrieved on Oct. 9, 2003!

* cited by examiner

Prior Art

TECHNIQUES FOR REINSERTION OF LOCAL MARKET ADVERTISING IN DIGITAL VIDEO FROM A BYPASS SOURCE

TECHNICAL FIELD

This invention relates generally to providing programming content via digital signals to subscribers, and more specifically to techniques for reinserting local content commercials in a digital video format into a transmission otherwise stripped of local or regional advertisements.

BACKGROUND OF THE INVENTION

Providing broadcast and subscription television, or other programming content via a transmission medium, to users generally involves a complicated, multilayer system. In a terrestrial broadcast television system, for example, users in a local market area generally receive the terrestrial program signal from a local television broadcast station. This local broadcast station may create its own programming content for transmission to users, it may transmit prerecorded content, or it may retransmit content received from another transmission source.

FIG. 1A displays a commonly employed scheme for broadcasting a program signal from a location, such as a sporting event 100, to a subscriber or consumerwatching the event from a cable network. An on-site facility 110 generally records the event and converts the recording (whether analog or digital, and regardless of media) into one or more digital program signals, which are relayed to a national broadcast network 115. This network, in turn, distributes the digital program signals to its local affiliates, e.g., local affiliate 140. This distribution may be made through terrestrial or satellite broadcasts. Further, the national network may add national commercials to the program signal in appropriate places. Next, the local affiliate transmits the program signal either via a terrestrial transmitter 170, a fiber optic cable, via a satellite, or across a cable network to a local headend 150. The subscriber or consumer then receives the broadcast from the headend or antenna, as appropriate for the consumer's system.

When sending syndicated programs, national networks may sell commercials between programming segments for their entire signal footprint, i.e., all of North America, at once. These commercials are transmitted as part of the national network satellite feed and are eventually received, after retransmission by the local broadcast station, by every user viewing that programming on the local affiliate channel. For example, NBC could sell a commercial spot for "Tide®" detergent to appear at a certain time during an episode of "Friends" on a Thursday night. NBC would insert the "Tide®" detergent commercial between segments of the "Friends" episode, and uplink the combined entertainment and commercial programming to a satellite for transmission to local broadcast station affiliates, that in turn transmit the programming to the viewing users in the market.

Usually, the national networks do not sell all of the advertising space available during national network programming. In fact, by contract, some of the advertising space is reserved for insertion of local advertising by the local broadcast station affiliates. Because the national feed is received for retransmission by the local broadcast station affiliate, the local affiliate can insert local commercials in the remaining space regardless of whether the national network programming is immediately retransmitted to the local market or recorded for later transmission.

Many national networks also broadcast major sporting and entertainment events, which are typically viewing in a region through a local affiliate's cable, terrestrial, or satellite broadcast without requiring a premium subscription. For example, the Super Bowl is generally filmed by a national network, such as FOX, transmitted via satellite to local affiliates, and rebroadcast from the local affiliate to the surrounding market.

However, many such marquee events are simultaneously offered in a premium format having additional features not readily available to consumers watching the standard broadcast. This premium format may include multiple camera angles, exclusive interviews, facts and trivia about the event and its history, and other data streams originating at the event and bundled together. Further, the premium format may offer interactivity to the subscriber, permitting him or her to retrieve information from the Internet related to the event, respond to on-screen questions or surveys, participate in games linked to the event, and so forth. Often, the premium format is marketed on a subscriber basis, requiring a consumer to purchase the premium format and tune to a specific channel to watch it. Generally, each of the data streams is available for a subscriber to switch between at his or her leisure, thus permitting the subscriber greater flexibility and the ability to see those portions of an event of most interest to him or her. The broadcast of an event in this format and having multiple selectable data streams is referred to herein as an "customized event."

A commonly used method for transmitting a customized event is shown in FIG. 1B. The on-site facility 110 captures the event 100 via multiple data inputs, each of which are transmitted to a national network as a digital program signal. However, rather than transmitting the program signals (with or without inserted national commercials) to a local affiliate, the national network typically multiplexes the various program signals into a single data stream, which is then sent across a satellite to a facility capable of further digitizing, compressing, and distributing the data stream, illustratively facility 130. One example of such a facility is AT&T's "headend in the sky" (HITS), located at the AT&T Digital Media Center (ADMC) in Denver, Colo. Generally, HITS 130 then relays the processed data stream through one or more satellite relays to a plurality of cable network headends 150. Each headend 150 is then responsible for transmitting the customized event to the subscribers 160 serviced by that headend. Accordingly, the national network generally provides a nationwide customized event feed to subscribers without any intervention by its local affiliates.

Although customized events are popular and widely available, their format does create several problems for broadcasters and local affiliates. When customized events are transmitted across a satellite or cable network to a subscriber, they generally bypass the local and regional affiliates completely and are directly transmitted nationwide via a satellite or cable network broadcast. Accordingly, because the national network makes the customized event available on a national level without intervention or relaying by its local affiliates, local content commercials are rarely, if ever, inserted into the customized event data stream. Local and regional advertisers unfortunately cannot join a potentially lucrative market capable of reaching many subscribers in their immediate area. These same local advertisers further may lose viewers who would normally watch a non-enhanced event to the enhanced version thereof, again reducing the overall impression made by a local advertisement.

Accordingly, there is a need in the art for a method and system for inserting local or regional content commercials into a national digital data transmission.

BRIEF SUMMARY OF THE INVENTION

Generally, the present invention comprises a method, system, and apparatus for reinserting local content commercials in a digital video format into a customized event transmission otherwise lacking local advertisements. Generally, a customized television event is broadcast as a plurality of program signals multiplexed as a single data stream. Each program signal is assigned a service ID, or "SID." A subscriber may freely switch between any of the program signals comprising the customized event. Customized events typically lack any commercials directed at a local market.

In a first embodiment of the present invention, the plurality of SIDs in a single customized event data stream may be used to protect and transmit local commercials for a number of designated market areas, or "DMAs." Because the data stream comprises a plurality of SIDs, all SIDs and their associated data are always available to a subscriber, in order to permit him to freely switch between program signals. At appropriate times, the data in each program stream may be replaced with a local content commercial intended for a specific geographic area along with a software command targeted at the cable headends or set top boxes in that area. When the headends and/or set top boxes receive the software command, they will automatically force the subscriber's television or other display device to display only the SID carrying the local content commercial for the subscriber's geographic area. A second software command may return switching capability to the subscriber.

In a second embodiment, the data stream comprising a plurality of SIDs may also carry multiple local content commercials, as detailed above. Here, however, instead of forcing a headend or set top box to switch to a specific SID carrying an appropriate local content commercial via a software command, a trigger common to the data stream may be used. For example, the headend may receive a Digital Video Standard (DVS) 253 signal or analog cue tone. This signal may instruct the headend to automatically transmit a specific SID to associated set-top boxes, thus forcing each subscriber to see the local content commercial.

In a third embodiment of the present invention, a personal video recorder ("PVR") connected to a cable or satellite network may be used to capture and store local content commercials for an indefinite time. Because PVRs are connected to and capable of receiving data streams from a cable or satellite network, they may be used to store local content commercials in advance and play them back at the point in a customized event data stream signaled by a software command. Thus, local content advertisements may be "pre-parked" at the subscriber's residence and inserted as necessary into a customized event by the PVR.

A third embodiment of the present invention permits a cable headend to insert local content commercials into a customized event. Generally, the headend receives not only the customized event data stream, but also a "standard" version of the customized event transmitted across a non-premium channel. By monitoring the commercial markers in the non-premium channel, the headend may retrieve a local content commercial from the non-premium channel and insert it into the customized event data stream. Alternately, the headend may simply retrieve a local content commercial from a storage device located at the headend in response to a software command initiated by the network, and insert the commercial into the customized event feed.

In a fourth embodiment of the present invention, the local affiliate receives a customized event data stream from a satellite or directly from the event site itself. By locating a multiplexer at the local affiliate, rather than at a headend, the ability to splice local content commercials into the customized event data stream in given to the local affiliate. Further, the local affiliate may splice multiple local content commercials into the plurality of SIDs comprising the data stream. Each SID may have a different local content commercial spliced therein.

In a fifth embodiment of the present invention, a dual-tuner receiver may be employed to insert local content commercials into a customized event data stream. While the subscriber views a customized event through one tuner, the second tuner may receive a local content commercial feed from a variety of sources. At the proper moment, the receiver switched its output from the first tuner to the second tuner, effectively placing a commercial before the subscriber at the proper moment.

In addition to the insertion of local advertisements, the present invention may be used to insert news items, emergency signal tests, weather alerts, and so forth into a customized event data stream.

Accordingly, the present invention, in all its embodiments, comprises a method and system for inserting local content commercials or regional media into a customized event data stream. The various embodiments and their methods of operation are more particularly described with respect to the figures in the detailed description of the invention, below.

DETAILED DESCRIPTION OF THE INVENTION

Exemplary Operating Environment

Figure 1A:
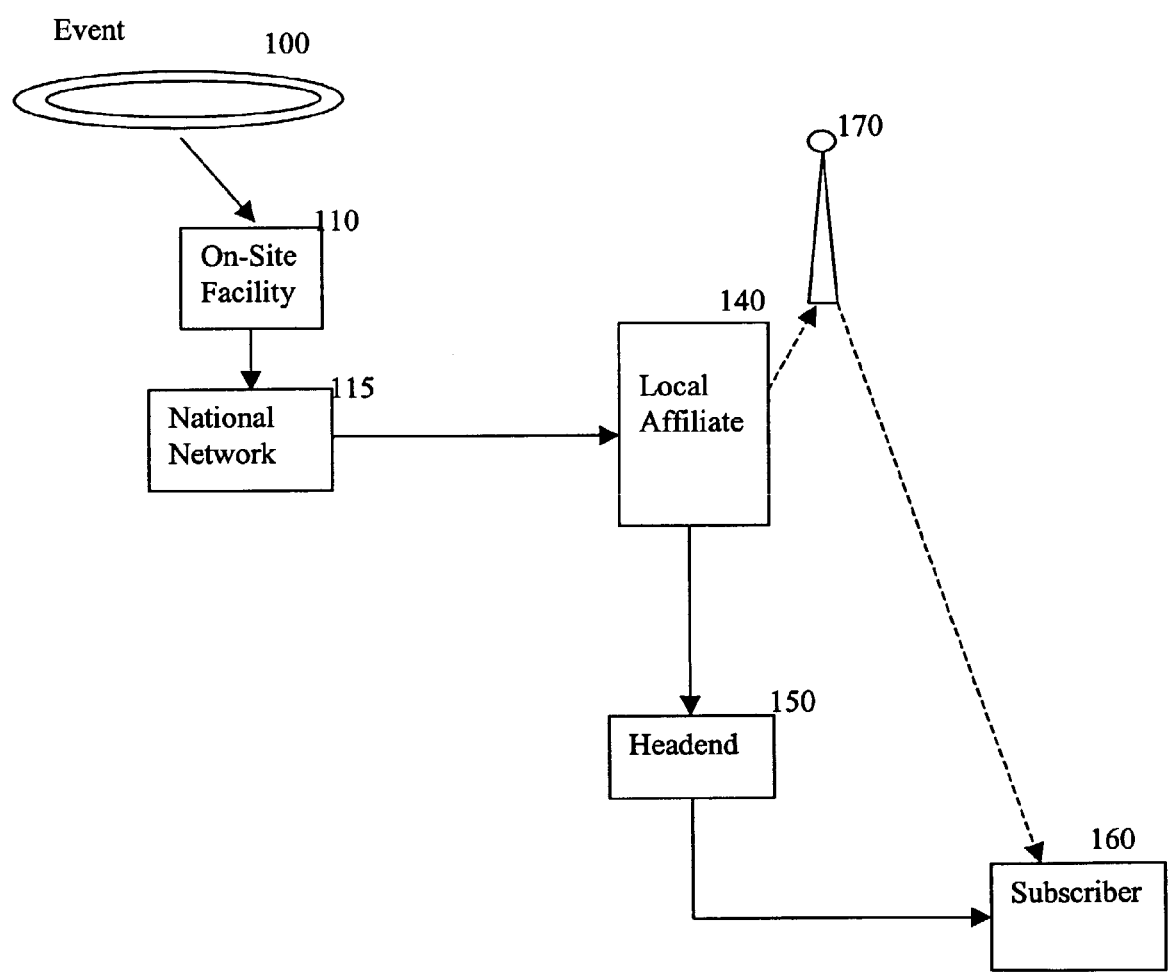
FIG. 1A displays an operating environment for transmitting a program signal to a consumer.
Figure 1B:
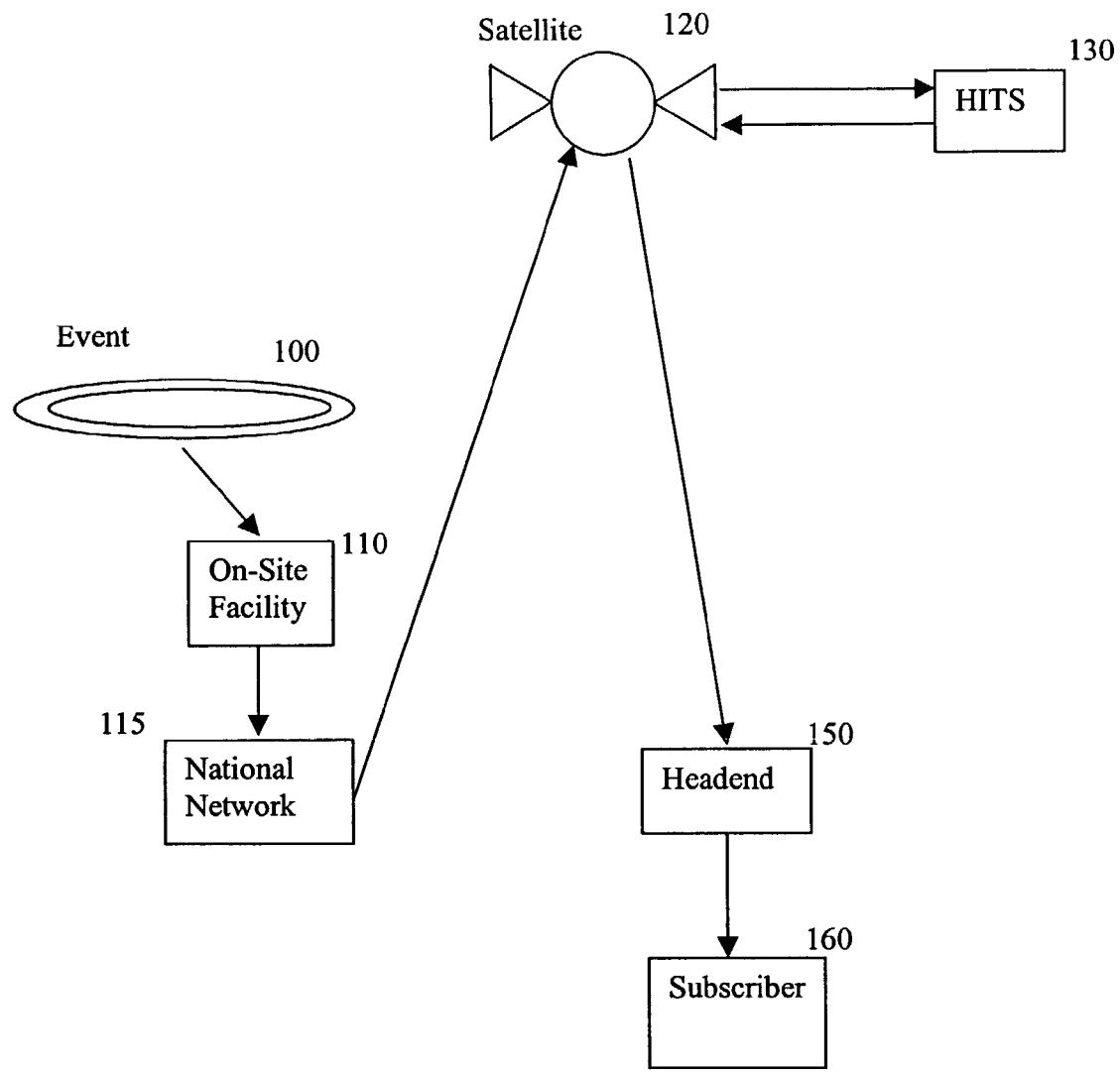
FIG. 1B displays another operating environment for transmitting a program signal to a consumer.
Figure 2:
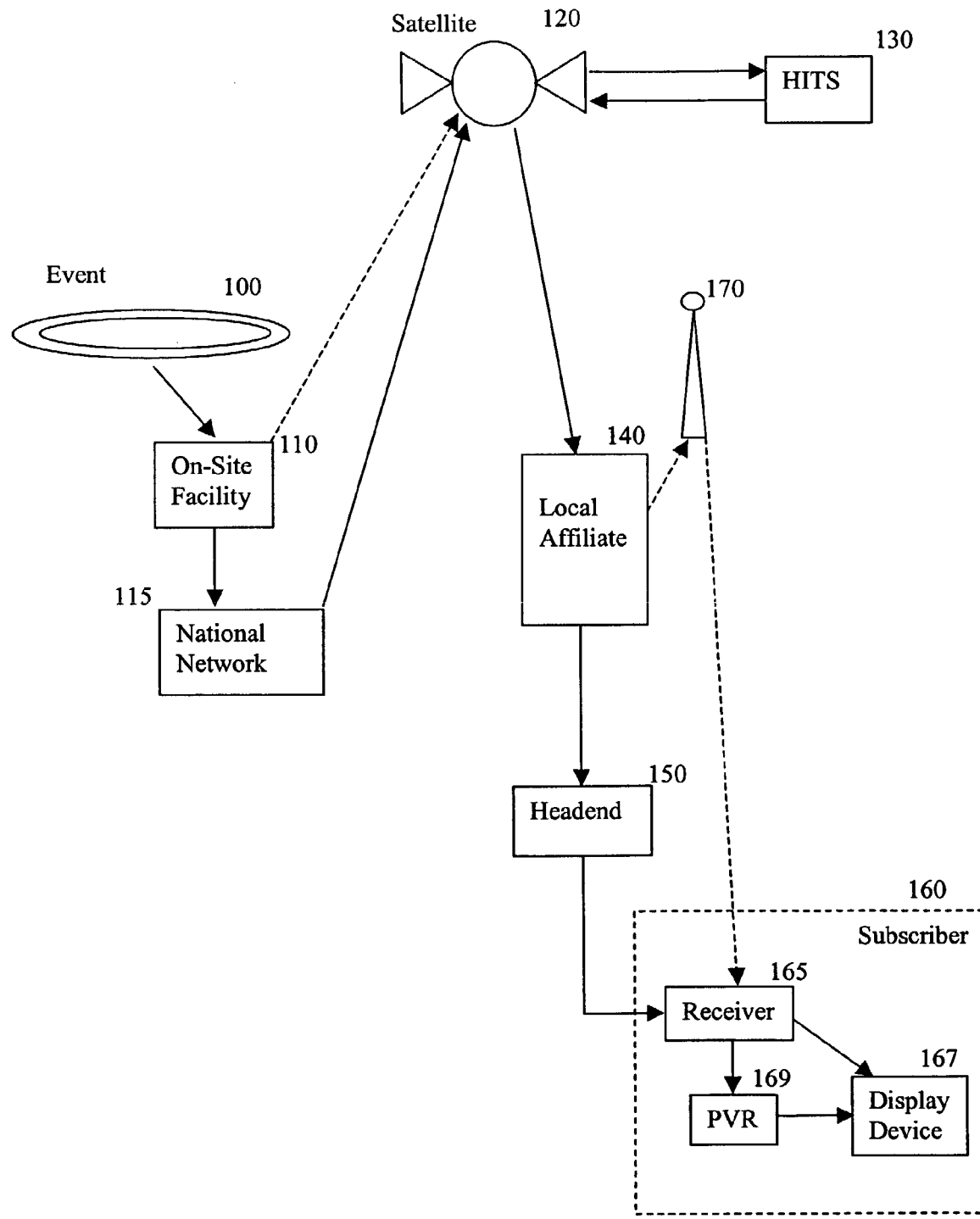
FIG. 2 displays an exemplary operating environment for an embodiment of the present invention.

FIG. 2 displays an exemplary operating environment for the present invention. Generally, the video and audio aspects of an event 100, such as a sporting event or awards ceremony, are recorded via one or more cameras, microphones, or other recording devices. Each video or audio recording device creates a separate program signal, all of which are transmitted to an on-site control location 110. For example, a NASCAR race may have one camera in the pit, one in a driver's car, one in the announcer's booth, one at either end of the track, one in each straightaway, one following the moving cars around the track, a "roving" camera used to capture audience reactions, and a data stream dedicated to providing additional statistics or facts of interest to racing fans, for a total of ten program signals. The combination of these various data streams, marketed as a single programming experience available to a subscriber, is generally referred to as an "customized event." Typically, customized events are displayed to a subscriber 160 on a single network channel, and allow the subscriber to individually tailor his or her viewing experience by shifting the display at will between the various program signals. The programming, multiplexing, and display of various customized events is described more fully in U.S. patent application Ser. No. 08/815,168, filed on Mar. 11, 1997, and entitled "A Digital Interactive System for Providing Full Interactivity With Live Programming Events," which is hereby incorporated by reference in its entirety.

At an on-site control location 110, the various program signals may be encoded and combined into a single data stream. Alternately, this multiplexing may be accomplished at the national network 115. Further, the data transmission is generally digitized for ease of transmission and optimizes use of available bandwidth. Continuing with the above example, the on-site control location 110 receives each of the ten program signals and multiplexes them into one data stream for transmission.

The single digital data stream is transmitted from the on-site control location 110 to a national network 115, which in turn sends the data stream to a satellite 120. Alternately, the data stream may be terrestrially transmitted to a local broadcast site 170, such as a transmitter tower (not shown). In yet another alternate embodiment, the on-site facility 110 may broadcast directly to the satellite 120, effectively eliminating the national network 115 as a transmission step. In a further embodiment, the on-site facility may broadcast via fiber-optic cable (not shown) directly to one or more headends 150.

Once received by the satellite 120, the data stream is relayed to a digitization and compression facility 130, such as AT&T's "headend in the sky" system (HITS) located at the AT&T Digital Media Center (ADMC) in Denver, Colo., where the stream is digitally compressed, further encoded, and may be combined with programming received from other sources. Typically, digital compression reduces the size of the data stream, which in turn reduces the bandwidth necessary to carry the stream.

Generally, common digital compression methods include suppressing long streams of similar bits, implementing delta transmission methods (that is, only sending information about the difference between signal sampled at two successive periods of time), and matching the picture or audio quality to human sensory limitations by eliminating excess detail. An example of digital compression schemes known to those skilled in the art, and accordingly available for use with the present invention, is MPEG-4, whereby different audio, video, and graphics objects may be chosen for display depending upon accompanying instructions. Additional examples include MPEG-1, MPEG-2, MPEG-7, and MPEG-21 schemes.

From the HITS 130 or other facility, the compressed data stream is generally again sent to a satellite 120, which may or may not be the satellite relaying the data stream from the on-site control location to the compression facility. In an alternate embodiment, the HITS 130 facility may transmit the compressed data stream directly to one or more headends 150, eliminating the satellite 120 rebroadcast.

In turn, the satellite (or headend) relays the compressed digital data stream to a local broadcast affiliate 140. The local affiliate 140 may then decode the transmission. Further, the local affiliate may reformat or otherwise alter the transmission as it sees fit. For example, a local broadcast affiliate 140 may add a station identifier, or "bug," to each data stream in order to ensure that the bug is present no matter which camera view a subscriber watches.

From the local affiliate, the data stream is passed to a cable headend 150. The headend 150 acts as a gateway, controlling and monitoring the flow of program signals and other data to and from the local affiliate across a cable network. The headend directs the customized event feed to each subscriber 160 eligible to receive it. Further, the headend 150 ensures that each separate data stream is received by the subscriber. This ensures that the subscriber 160 may view at will any of the program signals desired.

A receiver 165 at a subscriber's location receives the program signal and processes the signal for presentation on a display device 167, such as a television, computer monitor, PDA, web tablet, cellular phone, and so forth. Generally, this processing includes demultiplexing the data stream into the separate program signals comprising the customized event. The receiver 165 may be a set-top box, circuitry and software resident on the television itself, or a computer with appropriate video cards and software. Throughout this application, the terms "receiver" and "set-top box" are used interchangeably, and both should be construed to refer to all of the aforementioned configurations and their equivalents.

Generally, a subscriber 160 may freely swap back and forth between any of the program signals comprising the customized event feed simply by initiating channel changes through means well known to those in the art, such as via a remote control. However, an upstream element may force, via a software command to the receiver 165, a specific program signal or portion thereof to be played on the subscriber's display device 167. Thus, continuing the example, a local affiliate 140 may force all receivers 165 to switch from any program signal to a single camera feed showing the winner of the race. A second software command may restore broadcast switching functionality to the subscriber 160.

Multiple Program Feeds

As previously mentioned, one customized event transmission may contain multiple program signals originating at the event. Generally, these program signals are contained in a single data stream throughout the data transmission process, and are only separated into discrete signals by the receiver 165 in a subscriber's home or a headend 150. Each audio or video recording source, along with any customized data such as Internet links or World Wide Web information, comprises a separate program signal.

Figure 3A:
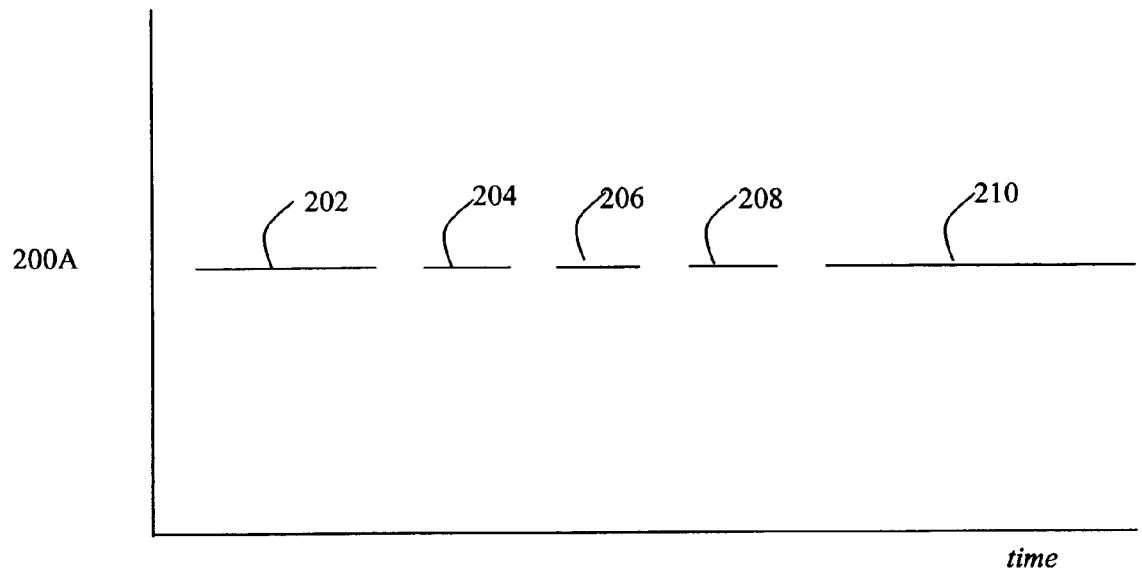
FIG. 3A displays a timing diagram showing multiple program signals associated with a customized event.
Figure 3B:
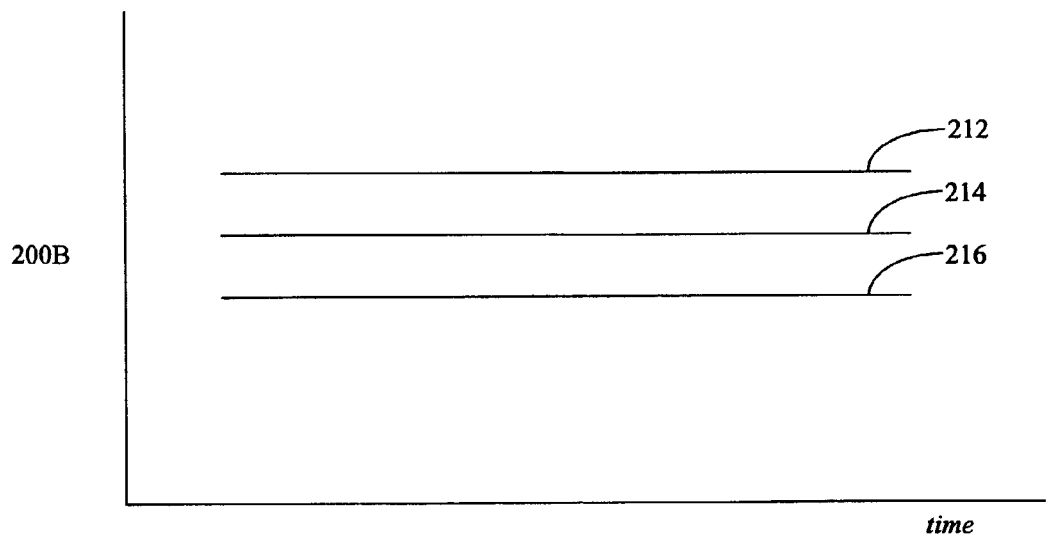
FIG. 3B displays another timing diagram showing multiple program signals associated with a customized event.
Figure 3C:
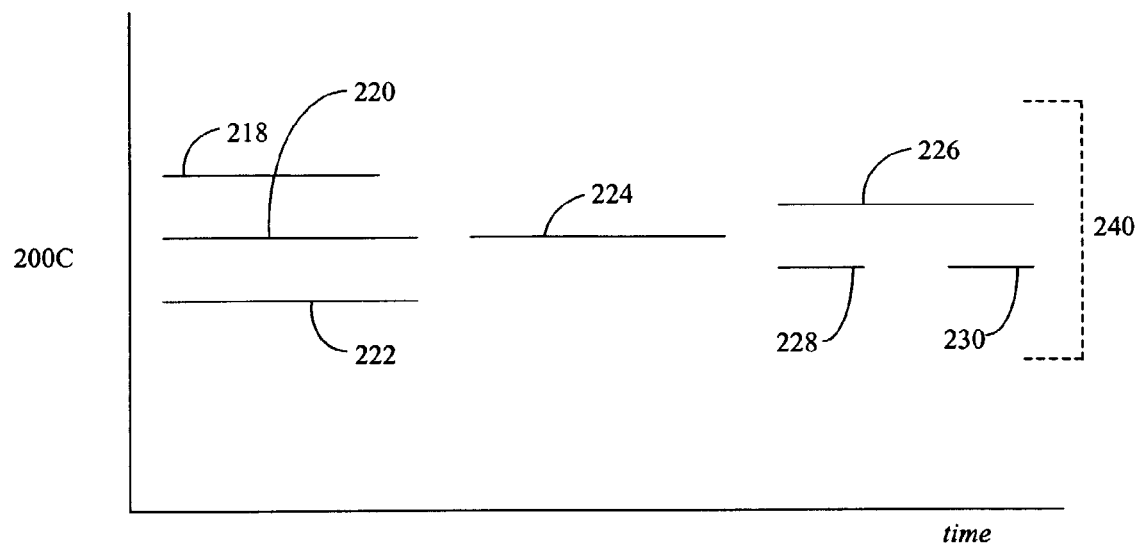
FIG. 3C displays yet another timing diagram showing multiple program signals associated with a customized event.

FIGS. 3A, 3B, and 3C show various illustrations of timing diagrams in which program signals 200A, 200B, and 200C comprise multiple programming segments. The programming segments may be sequential programming segments, such as segments 202, 204, 206, and 210 shown in FIG. 3A, and/or parallel programming segments, such as segments 212, 214, and 216 shown in FIG. 3B. Sequential programming segments include segments, such as segments 202, 204, 206, and 210, that are transmitted in distinct time intervals. For example, programming segments transmitted sequentially may include segments such as a video feed interrupted by a series of commercial programs and resumed upon the completion of the commercial programs.

Parallel programming segments, however, include programming segments that are transmitted in at least partially overlapping time intervals. Parallel programming segments, such as segments 212, 214, and 216, may include different programming content from which a subscriber may select one or more of the segments for presentation. To continue the NASCAR example, the segments may represent a video stream from the pit, a video stream from the roving camera, another video stream from inside the driver's car, and a video stream from the announcer's booth. The subscriber 160 may select one or more of the individual programs to have presented as part of the customized event experience. Parallel programming segments may be transmitted in an analog or digital format. An analog transmission of parallel programming segments, for example, may include transmitting the programming segments at different frequencies such as, but not limited to, at pre-defined radio channels, such as broadcast television, and/or cable television channels, or at other frequency ranges within or outside of pre-defined channels. Alternatively, the parallel programming segments may be formatted as packets within a digital program signal. One skilled in the art, however, would readily recognize that parallel programming segments could be transmitted in any other format that may be desired for a particular system or process of the present invention.

A program signal may include both sequential and parallel programming segments. In FIG. 3C, for example, program signal 200C includes parallel programming segments 212, 220 and 222, which are transmitted concurrently, followed by sequential segment 224. Segment 224 is then followed by segments 226, 222, and 230. In this example, segment 226 is being transmitted concurrently with sequential segments 222 and 230.

Each program signal is preferably assigned a signal identifier 240 ("SID"). The SID 240 may be assigned, for example, by an information provider such as the on-site control facility 110, at a transmission system such as HITS 130 or local affiliate 140, at the receiving system such as a headend 150, or any other portion of the environment discussed with respect to FIG. 2. The signal ID may be unique for each program signal, or group of program signals may share a common SID. In an embodiment having two types of programs such as feature presentations and commercials, for example, a group of individual commercial programs that collectively form a single commercial break in a feature presentation may be assigned to a program group having a single SID 240. Alternatively, a group of related programs, such as individual episodes of a mini-series, may be assigned to a group having a single SID 240. A common example of a SID is a program identifier, or "PID."

Changes between individual programming signals may be active state changes or passive state changes. In an active state change, the system transitions from one program to another due to an action or a preference associated with the subscriber, such as by the subscriber changing channels or view angles. In an active state change, the subscriber is not necessarily done with the program that was left and may also be interested in the new program signal that was entered. Thus, the state for the program being left is preferably stored, if possible, so that if the subscriber returns to that program, the data and/or the results of any previous interaction for that program are maintained. If a state is already stored for the program to which the subscriber has actively transitioned, e.g., having a matching SID, then the stored state can be restored as the active state. If there is no stored state for the program to which the subscriber has actively transitioned, a new state can be created for that program and established as the active state of the system.

By using state changes, a local content commercial may be inserted into a program signal without unduly interfering with a subscriber's viewing preferences. For example, where a local content commercial replaces a portion of a program signal currently viewed by a subscriber, the program's state may be stored and retrieved following the end of the local content commercial. In this manner, a subscriber may be easily returned to a program after viewing an inserted commercial, news announcement, or other update.

Accordingly, in the present embodiment each program signal or group of program signals transmitting a portion of a customized event is assigned a discrete and unique SID. Thus, in any given customized event transmission, there are generally multiple SIDs received by and available for a subscriber.

Commercial Insertion

For broadcasting purposes, the United States is generally broken up into two hundred and ten broadcast regions, each of which shares a broadcast signal. These regions are referred to as "designated market areas," or DMAs. DMAs are used to identify local affiliates 140 whose broadcast signals reach a specific area and attract the most viewers. A DMA consists of all counties whose largest viewing share is given to affiliates 140 in that same market area. Non-overlapping DMAs cover the entire continental United States, Hawaii and parts of Alaska. For example, as of the 2001-2002 television season, New York City and the surrounding area comprises a single DMA having approximately 7.3 million households therein.

In one embodiment of the present invention, the multiplicity of SIDs 240 contained in a single customized event transmission may be used to insert and transmit local content commercials for a number of DMAs. Because a customized event broadcast comprises a plurality of SIDs 240, multiple SIDs and their associated data are available to a single subscriber at any given moment. Normally, the subscriber switches between program signals 200 (e.g., 200A-200I) at will, in order to experience those portions of a customized event in which the subscriber is interested.

During a scheduled commercial break, the program signals 200 carried on each SID 240 may be replaced with commercials. Because each subscriber 160 receives all SIDs associated with the event 100, each subscriber will receive a plurality of commercials. Generally, in the present embodiment each SID 240 will carry a local content commercial intended for a single DMA. The set-top box or receiver 165, however, may be instructed to display only the SID 240 carrying the local content commercial for the area in which the set-top box resides.

Figure 4:
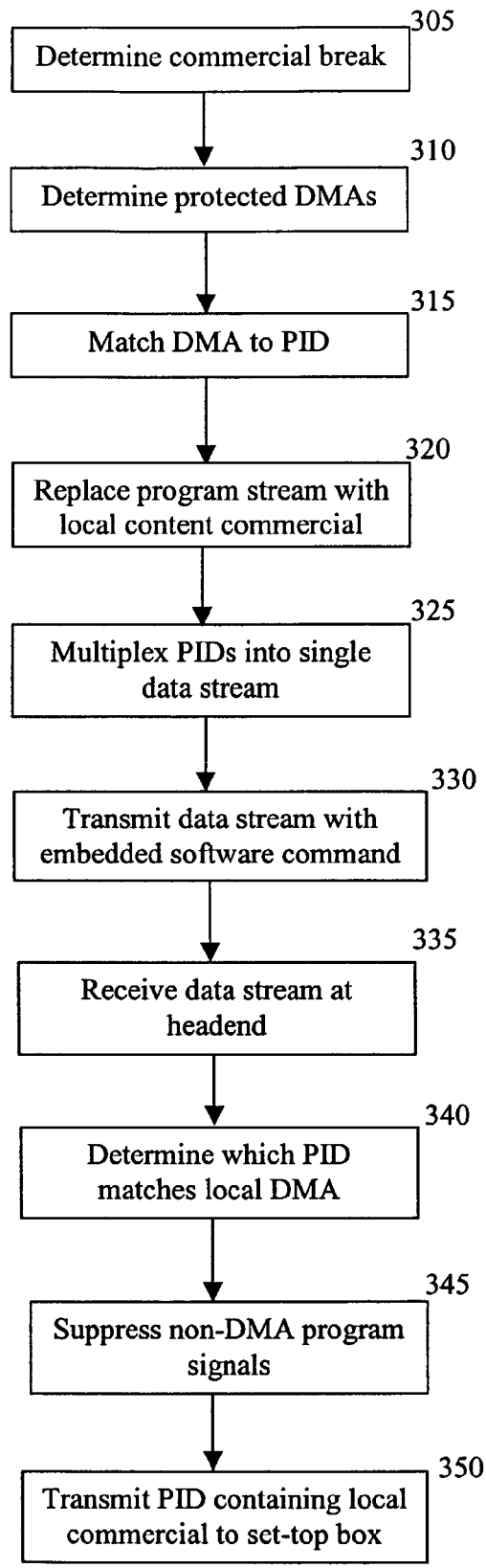
FIG. 4 displays a flowchart detailing the operation of one embodiment of the present invention.

FIG. 4 displays the steps necessary to provide local content commercials to a specific DMA. Initially, in step 305 illustratively the on-site control location 110 or compression facility 130 determines the time and length of commercial breaks in a customized event. Generally, these breaks correspond to the times of commercials placed in national, non-customized broadcasts of the same event, although the breaks may be spaced differently if desired.

Next, in step 310, the on-site control location 110 or compression facility 130 determines for which DMAs it wishes to insert local commercials into the data stream. Because the number of DMAs that may receive local commercials is limited by the number of SIDs 240 available, the largest DMAs (in terms of viewing households) receiving the broadcast of the customized event will usually be selected to be matched to a SID. In an alternate embodiment, local household-based devices (such as a set-top box) may be used to more finely focus local content commercials, permitting commercials to be sent to multiple DMAs or even portions of DMAs. Such an embodiment is discussed in the section entitled "Receiver Commercial Insertion," below.

In step 315, each DMA is matched with a single SID 240. If necessary, the data stream is demultiplexed into its component program signals. In step 320 the relevant local content commercial is placed in the data stream at the appropriate point, replacing the program signal. Generally, a header such as the DVS 253 standard header, software command, or other commercial identifier is placed in the SID 240 immediately preceding the commercial itself. A DMA identifier may also be placed in each SID prior to the local commercial in order to identify the DMA for which the commercial is intended.

In step 325, the various program signals (each now containing a local content commercial directed at a specific DMA) are remultiplexed at the on-site control location 110 or compression facility 130. Next, the data stream is transmitted through the network to a headend 150 in step 330. In step 335, the headend receives the data stream, including all associated SIDs 240.

Because each headend 150 is connected to a larger network and is responsible for transmitting programming to individual set-top boxes 165 and/or local network nodes, a headend is generally provided with geographic data indicating its general location and the DMA in which it resides. Accordingly, the headend 150 may identify in step 340 which of the various SIDs 240 contains a DMA identifier indicating a local content commercial matching the DMA of the headend. In step 345, the headend 150 may transmit the identified SID 240 and commercial corresponding to its DMA while suppressing the other program signals. Thus, in step 350 the set-top box 165 receives only the program signal 200/SID 240 containing a commercial associated with the proper designated market area. This ensures that the subscriber 160 sees the proper local content commercial. Once the time period for running a local content commercial ends, the headend 150 discontinues suppression of SIDs 240 and passes all program signals to the subscriber 160 as a single multiplexed data stream.

In the event that a headend 150 and set-top box 165 are not in any DMA having a local content commercial embedded in a SID 240, the headend may elect to send all SIDs comprising the customized event data stream to the set-top box, may intelligently select or default to a SID for transmission, or may select the SID having a local content commercial for the closest DMA.

In an alternate embodiment, the headend 150 may pass along all SIDs 240 to the set-165 top box in the form of a multiplexed data stream. Generally, the set-top box also possesses geographic data similar to that of the headend 150. Accordingly, the set-top box may determine via software which SID contains a local content commercial matching the box's 165 DMA, suppress the others, and force the display of the appropriate commercial.

PVR Commercial Capture

Many modern households have a personal video recorder 169, or PVR, connected to their television and/or set top box. PVRs are also often referred to as digital video recorders, or "DVRs." Generally, a PVR 169 is a device capable of recording a data stream received by a tuner within the PVR and storing the recording with a long-term storage device, such as a magnetic hard drive. Unlike a videocassette recorder, however, the PVR stores its recording as a digital format on an internal storage device, such as a magnetic hard drive.

Because PVRs 169 are connected to and capable of receiving data streams from a cable headend 150 or satellite 120, they may be used to store local content commercials in advance and play them back at the appropriate point in a customized event data stream. Many PVRs 169 have multiple tuners, and so may receive multiple data streams. Further, PVRs with more than one tuner may record one data stream while playing a second, even if that second data stream is replayed from the PVR's storage device.

Figure 5:
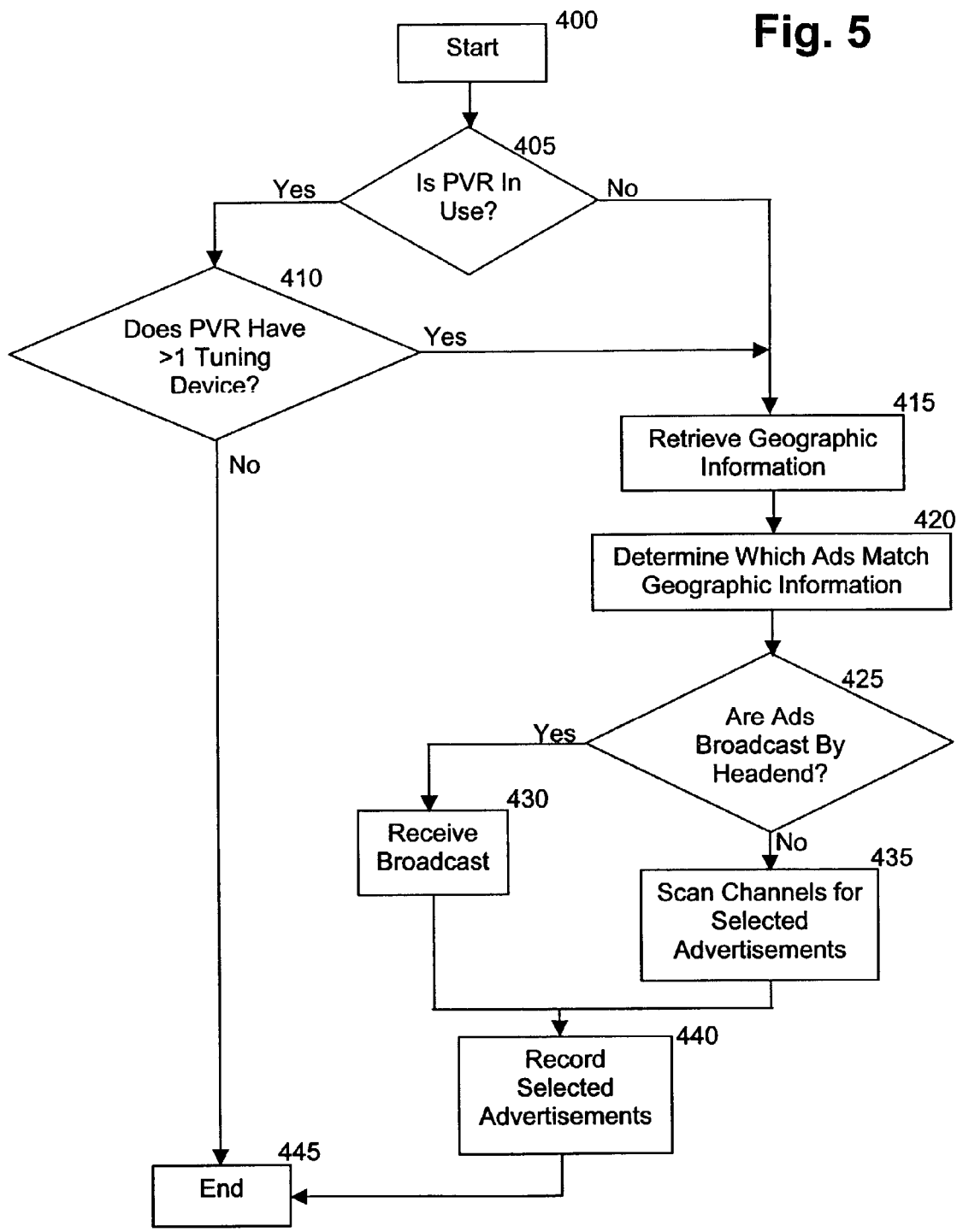
FIG. 5 displays a flowchart detailing the operation of a second embodiment of the present invention.

FIG. 5 displays a flowchart detailing the steps necessary to acquire a set of local content commercials for later display to a subscriber 160. This process may either be initiated by the present embodiment at set or random intervals. In this embodiment, the PVR 169 may download local content commercials periodically from a headend 150 or satellite 120 feed.

The local content commercial recording process begins at start step 400. Once the process begins, the embodiment determines in step 405 whether the subscriber's PVR 169 is in use. If the PVR is on and either recording or replaying a program, then step 410 is accessed. Otherwise, step 415 is executed.

In step 410, the embodiment determines whether the active PVR 169 has more than one tuning device. If not, then no targeted commercials may be stored and the process ends at step 445. If, however, the active PVR 169 has two or more tuners, step 415 is performed. The embodiment retrieves in step 415 subscriber's 160 geographic location data from the headend or set-top box, depending on where the location data is stored.

Next, the embodiment 310 executes step 420, in which it identifies those ads available either stored at the headend 150 or currently playing on a network channel that match the geographic data. Following step 420, step 425 is accessed. In step 425, the embodiment determines whether the commercials identified in step 420 are broadcast by the headend 150 on a dedicated channel or frequency, or whether the PVR must instead search through various broadcast channels to find suitable commercials. That is, in one embodiment, the headend 150 periodically broadcasts various commercials across a dedicated channel. Should the embodiment determine that one or more of these broadcast commercials is a local content commercial, the subscriber's PVR 169 may tune to the broadcast channel and record one or more commercials.

In the event that the headend 150 is indeed broadcasting commercials, step 430 is next. In step 430, the PVR 169 tunes one of its tuners to the advertising broadcast channel. Once the proper channel is found, the PVR 169 in step 440 records for storage currently playing local content commercials intended for the subscriber's geographic area. Following step 440, the process ends in block 445.

If, however, step 425 returns a negative response, step 435 is accessed. In step 435, the PVR 169 simply scans available broadcast channels received across the network for local content commercials. Local content commercials may be indicated by geographically identifying data embedded in a non-visible portion of the commercial, such as the vertical blanking interval (VBI) or overscan portions of the commercial. Alternately, a portion of the visible lines of the commercial may be used, such as lines 21-25 or 475-480. Further, geographic data may be transmitted as separate packets in the data stream, such as packets complying with the ATSC PSIP Data standards, such as the T3 S8 standard. This information may contain, among other things, a header identifying the start of the commercial, its geographic region of applicability (such as an intended DMA), and so forth. The method for embedding such data in a portion of a program signal 200 is well known to those skilled in the art. Once local content commercials intended for the subscriber's geographic area are found, the embodiment executes steps 440 and 445 as detailed above.

Of course, merely identifying and storing local content commercials does nothing to place such ads in front of a subscriber. The commercials must be shown to the subscriber in order to have any value. Accordingly, the embodiment may detect markers, such as a DVS 253 cue, in the program signal indicating a point at which a commercial is intended to be shown or at which a commercial is appropriate, retrieve a local content commercial, and play it in lieu of the normal contents of the program signal.

Figure 6:
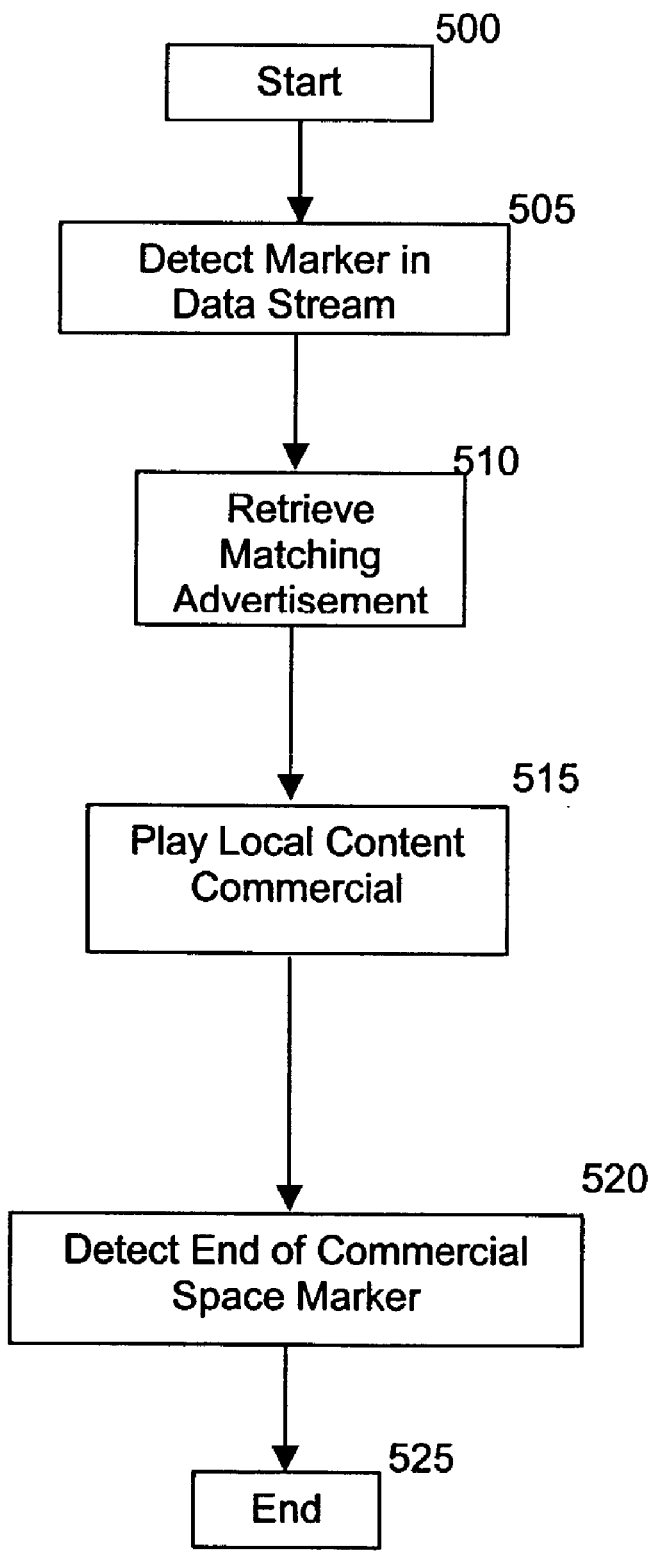
FIG. 6 displays a flowchart further detailing the operation of a second embodiment of the present invention.

An exemplary method for inserting pre-recorded local content commercials from a PVR 169 into a customized event program signal is shown in FIG. 6. The process begins at start step 500. Following step 500, the PVR 169 performs step 505, in which it locates a data marker in a customized event program signal indicating the beginning of a commercial space. Once the PVR 169 detects this information, step 505 is complete and step 510 is accessed. In this step, a previously stored local content commercial is retrieved by the PVR from its storage device. Step 515 is executed next, and the just-retrieved commercial is played in lieu of a portion of the program signal. During this play process, the embodiment restricts the subscriber's 160 ability to change from one program signal to another, thus forcing the subscriber to view the channel. The subscriber 160, of course, may always change the channel rather than view the local content commercial. Following step 515, the embodiment detects in step 520 a software command instructing the set top box to return to the subscriber the ability to switch to any of the program signals comprising the program signal. The process terminates at step 525.

It should be noted that the speed of commercial retrieval from the PVR's 169 storage device is such that the subscriber notices little or no delay in the video signal. To the subscriber's perception, the substitution of the local content commercial for the portion of the program signal is unnoticeable.

Headend Commercial Insertion

As previously discussed in the section entitled "Overview of an Embodiment," each headend 150 generally receives a single customized event data stream created from multiplexed program signals 200, each of which is assigned to a SID 240. Because the customized event data stream is a national (and often live) broadcast, local content commercials are often excluded from the data stream. Often, however, at least one program signal typically carries a "standard" program signal available to non-subscribers via a standard cable channel. This standard program signal 200 generally includes markers indicating the beginning and end of broadcast time set aside for commercials.

Because the headend 150 receives all SIDs 240 associated with a customized event, it necessarily receives the standard program signal as one of the multiple SIDs comprising the customized event. Accordingly, the headend 150 also receives the commercial start and end markers. With this information, a headend 150 may feasibly insert local content commercials into a customized event data stream.

A brief overview of the operation of a headend 150 may be useful prior to discussing the operation of this embodiment of the present invention. Generally, a headend 150 does not instantaneously relay a received data stream to a set-top box 165. Instead, the headend buffers the data stream for a short time, maintaining a small amount of data in a dedicated edge server or other recorder capable of recording and playing back video. The headend 150 sends on data only after it has cleared this internal edge server. Accordingly, the transmission leaving the headend 150 is delayed by the time length of the buffer with respect to the transmission entering the headend. Buffering permits the headend 150 to compensate for dropped data packets, thus minimizing video and/or audio digital artifacts experienced by a subscriber 160. Further, the headend 150 may multiplex digital and/or analog signals received from a variety of sources into a data stream that is ultimately transmitted to a set-top box 165 in a subscriber's 160 residence. The headend's 150 method of operation and buffering is well known to those skilled in the art, and the foregoing overview is intended to illustrate only the general operating principles.

Figure 7:
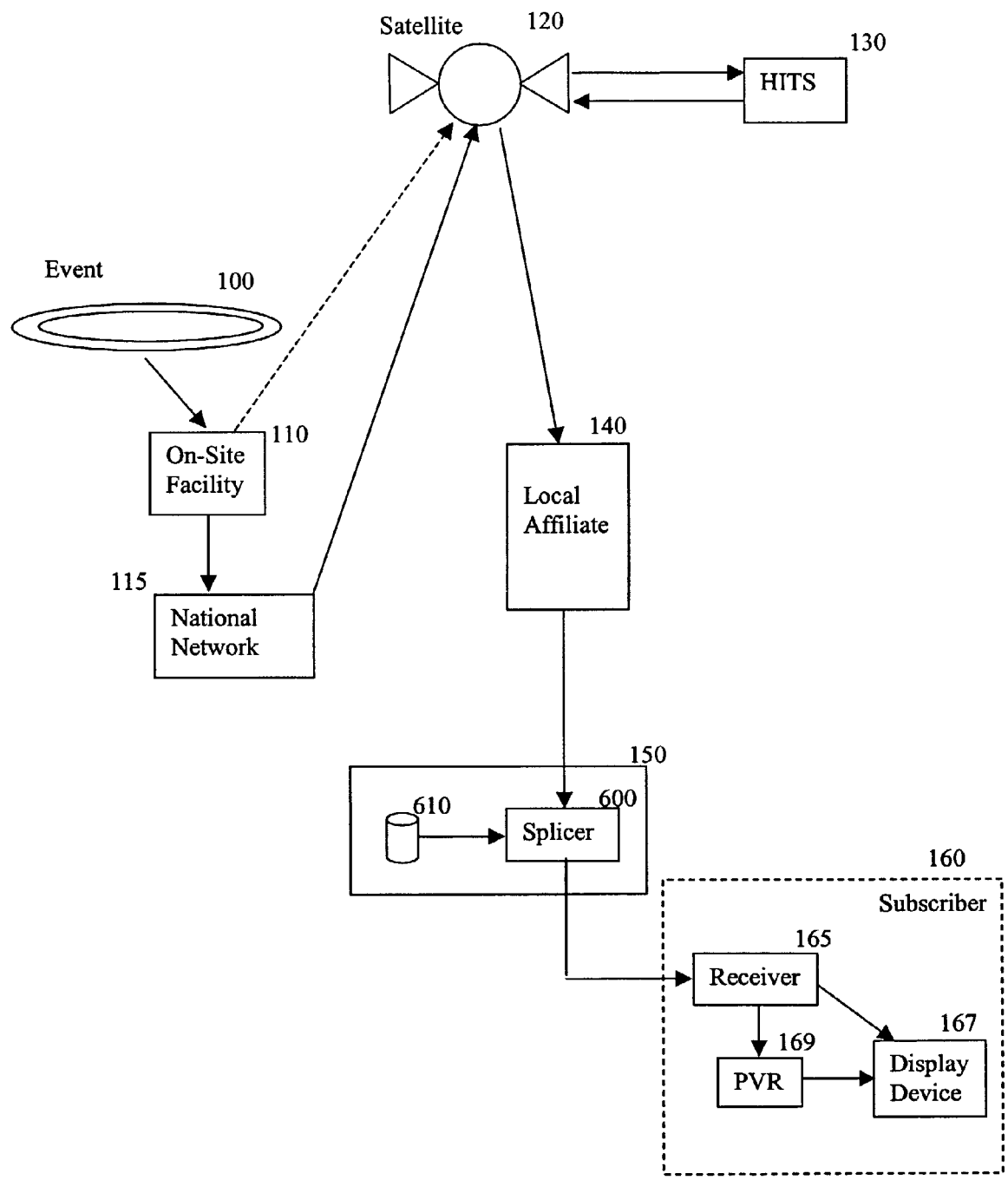
FIG. 7 displays an exemplary operating environment for a third embodiment of the present invention.

In this embodiment, discussed with respect to FIG. 7, the customized event data transmission proceeds as previously discussed up to the point where the data stream is received by the headend 150. When the headend receives the customized event data stream and detects a marker signaling the beginning of commercial space (typically inserted by the national network 115 or other broadcaster 130, 140), it may retrieve a local content commercial from a storage device 610 contained in or collocated with the headend 150. Such stored commercials are often referred to as being "pre-parked" at the headend 150. Because the customized event data stream is buffered, the headend 150 has sufficient time to retrieve the local commercial from storage, calculate the necessary frame adjustments required by the chosen compression scheme in order to seamlessly splice the commercial into the data stream, multiplex it and the various program signals as a remultiplexed data stream, and transmit the remultiplexed data stream to a set-top box 165 without a noticeable interruption or discontinuity in programming. Generally, the multiplexing of the data stream and local content commercial is handled by a splicer 600 collocated with the headend 150. The compression scheme employed by the headend 150 or local affiliate 140, compression facility 130 or national network 115 to transmit the data stream is irrelevant, so long as the multiplexer 600 is capable of interpreting the incoming stream and outputting a remultiplexed data stream using the same compression algorithm.

In an alternate embodiment, the headend 150 may monitor the standard event transmission for the presence of commercial markers. Upon detecting a marker in the standard event transmission, the headend 150 may retrieve a local content commercial and insert it into the customized data stream, as described above. This eliminates the need for the national network 115 to place special software commands in the customized event data stream.

Because each headend 150 services a geographic region considerably smaller than a DMA, this embodiment permits very geographically targeted advertising. For example, two headends 150, each serving a different section of a single city, may splice two different local content commercials into an otherwise identical customized event feed. That is, the north side of a city may see an commercial for a restaurant located therein, while the south side of a city may receive a commercial for a neighborhood car dealership.

In an alternate embodiment, the headend 150 may receive a local content commercial from a data stream containing a non-customized version of the same event being transmitted as a customized event. As previously mentioned, many local affiliates 140 broadcast standard versions of an event 100 available to cable recipients across one cable channel while transmitting a customized or premium version of the same event on a pay-per-view channel to paying subscribers 160. Typically, the standard version is encoded and compressed in a manner similar to the customized version, except that local content commercials are inserted by the local affiliate 140 at designated places.

The headend 150 generally receives both the standard and customized event data streams. Accordingly, the headend 150 may buffer the local content commercials contained in the standard event data stream and remultiplex them into the appropriate portions of the customized event data stream. This eliminates the need for pre-parking commercials at each headend 150.

Affiliate Commercial Insertion

Figure 8:
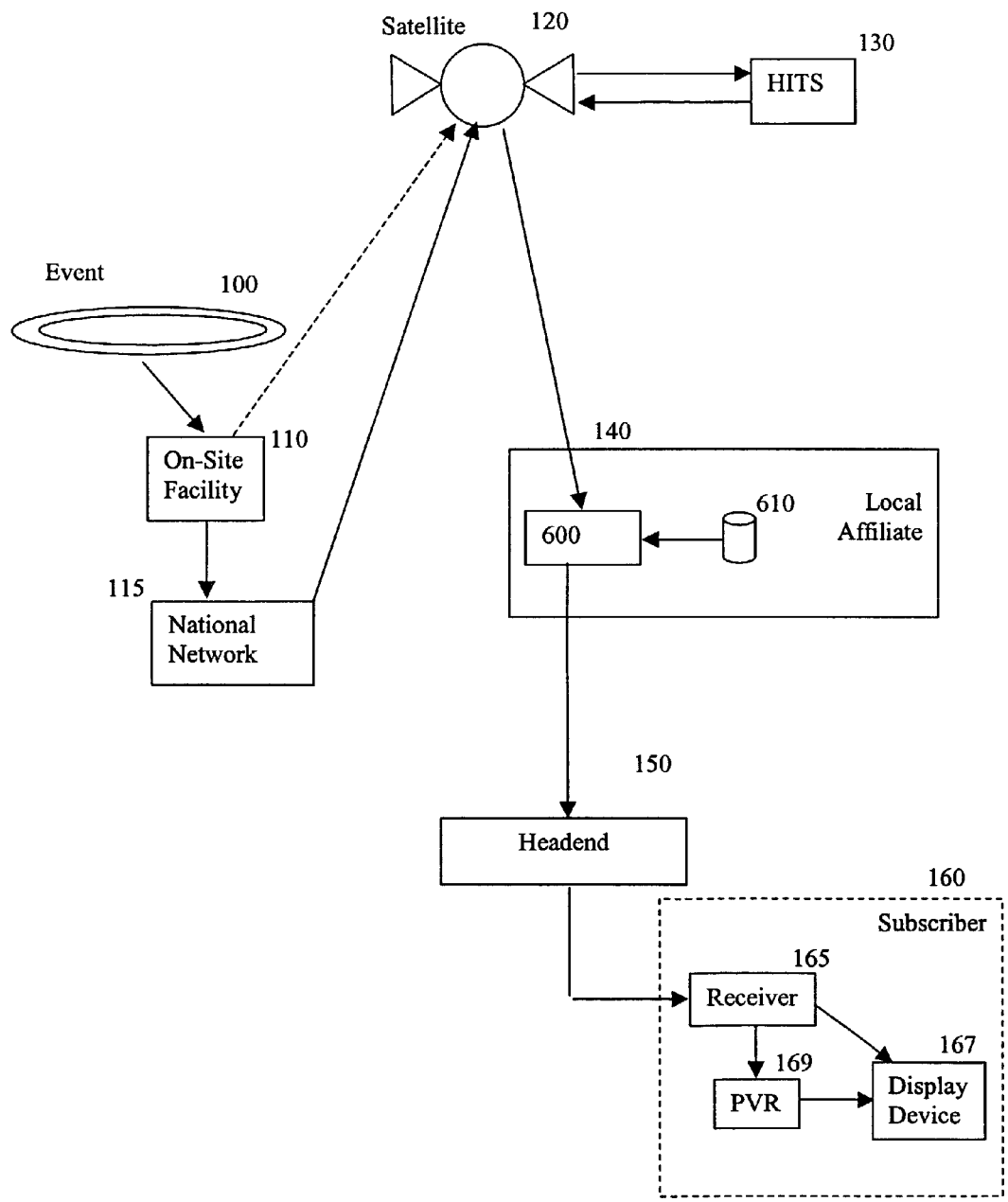
FIG. 8 displays an exemplary operating environment for a fourth embodiment of the present invention.

In a manner similar to headend 150 commercial insertion, described above, local content commercials may be spliced at the local affiliate 140. Generally, the customized event data stream bypasses the local affiliate 140 entirely, and is instead transmitted directly from a national network 115 or satellite 120 to a headend 150 in a cable network. In the present embodiment, however, the local affiliate 140 receives a customized event data stream from a 120 satellite or directly from the on-site facility 110 itself. By locating a multiplexer 600 at the local affiliate 140, rather than at a headend 150, the ability to splice local content commercials into the customized event data stream is given to the local affiliate. An example of the system architecture for this embodiment is shown in FIG. 8.

Generally, the method for splicing a local content commercial into the customized event data stream at the local affiliate 140 is similar to method disclosed above with respect to headend 150 insertion. This embodiment, however, permits the local affiliate 140 to retain more control over the specific commercials inserted into the customized event data stream. For example, the local affiliate might select on the fly from a variety of available local content commercials, rather than playing commercials in a set order. Also, by locating the multiplexer 600 at the local affiliate 140, the local affiliate may gain the ability to alter the customized event data stream in other ways. As a further example, the local affiliate 140 may use the multiplexer 600 not only to splice local content commercials into the customized event data feed, but also to add station identifiers or scroll bars containing breaking news.

Additionally, the local affiliate 140 may use the plurality of SIDs 240 inherent in the customized event data stream to splice multiple local content commercials into the stream. Each SID 240, for example, may have a different local content commercial spliced therein by the national network 115 or on-site control location 110. The local affiliate 140, in turn, may also embed commands in each SID instructing a specific set of headends 150 to suppress all SIDs 240 except one. This suppression command may be individually tailored in each SID to affect different groups of headends 150. In another embodiment, a single local content commercial may be placed in all SIDs and the suppression command eliminated. Thus, no matter which SID a subscriber views, the local content commercial is shown.

An example may serve to illustrate the above statements. Suppose that a local affiliate 140 transmits program signals 200 across a cable network to ten counties, each of which is serviced by a group of ten headends 150. In total, the local affiliate transmits data to one hundred headends. Taking the NASCAR example from above, ten unique program signals (and thus ten SIDs 240) are included in the customized event data stream. Generally, the local affiliate 140 knows the identifiers and locations of each of the headends 150 and associated set top boxes 165. Further, geographic groups of set top boxes 165 often share a common overall designation or identifier, such as a specific programmable address common only to headends 150 or receivers within a given county.

The local affiliate 140 may splice a different local content commercial into each of the SIDs 240. Additionally, the local affiliate may include a command in each SID 240 to the set of set-top boxes 165 for a given county to suppress all other SIDs, permitting only the single SID to be viewed by a subscriber 160. This command may be slightly different for each SID 240 in order to ensure that only the set top boxes 165 located in the county for which the local content commercial carried by the SID 240 is intended executes the command.

Thus, each county's set top boxes 165 suppress a different set of nine SIDs 240 and has a single SID available for viewing on the subscriber's 160 display device 167. Accordingly, each county's subscribers 160 may see a different local content commercial, namely that spliced into the single program signal 200 or SID 240 not suppressed by the set top box 165.

Alternately, the local affiliate may transmit a software command that instructs the headends 150 in a given area to suppress SIDs 240 containing undesired local content commercials, while transmitting only a single SID to receivers. This effectively forces the headend 150 to filter the program signals in a customized event data stream to ensure that the proper local commercial is seen in a given area, rather than relying on the set top box to do so. At the end of the commercial segment, a second software command may be sent to permit all program signals 200 to once again reach the set top box 165, thus restoring full functionality for the subscriber.

Receiver Commercial Insertion

Like many PVRs 169, most modern receivers 165 contain two separate tuners, each of which may receive a data stream. For example, satellite-compatible receivers 165 (such as those provided for use with DirectTV or the DISH Network) often contain two separate tuners in order to provide substantially instantaneous switching from channel to channel, even when such a channel switch would otherwise require a tuner to alter the polarity of the satellite dish. Generally, satellite 120 transmissions are polarized, having either horizontal or vertical polarity. Polarity switching is accomplished by changing the DC voltage of a low noise blockdown converter (LNB) positioned in the satellite dish from thirteen to eighteen volts. In broad terms, the LNB receives, processes, and amplifies data streams transmitted via satellite 120.

When a subscriber 160 has access to a dual-tuner receiver 165, an additional method for placing local content commercials into a customized event data stream presents itself. While the subscriber views a customized event through one tuner, the second tuner may receive a local content commercial feed from a variety of sources. At the proper moment (generally signaled by a header into the data stream or a software command), the receiver switches its output from the first tuner to the second tuner, effectively placing a commercial before the subscriber when required.

Figure 9:
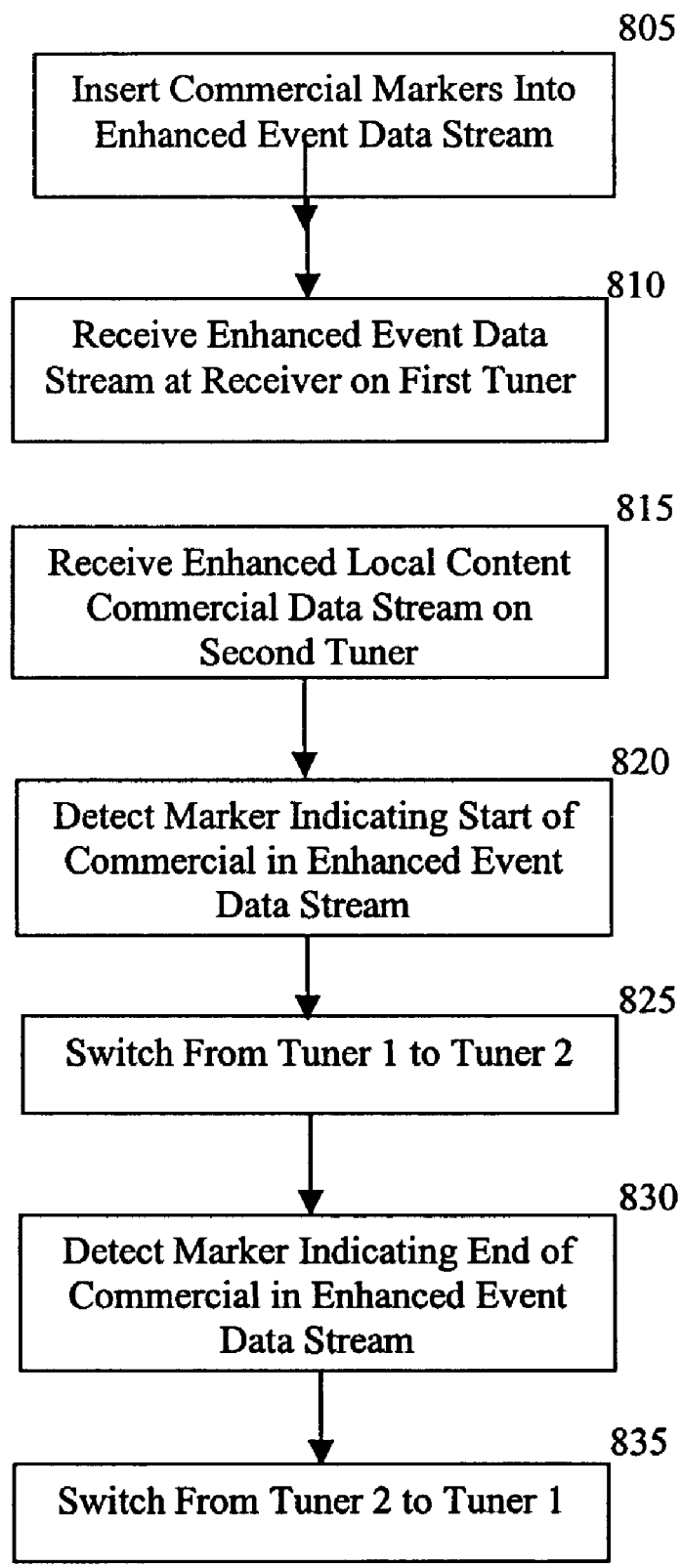
FIG. 9 displays a flowchart detailing the operation of a fifth embodiment of the present invention.

FIG. 9 displays the steps required for the present embodiment to insert a local content commercial into a customized event viewing. It should be noted that, unlike in previously discussed embodiments, the commercial is not inserted into the data stream per se, insofar as local commercial and customized event data streams remain separate. Instead, the customized event data stream is momentarily replaced by the local content commercial data stream. The end effect, however, is substantially identical to those achieved by previously discussed embodiments—the subscriber 160 views a local content commercial at the proper moment. This process may occur regardless of the transmission medium employed.

The process begins at step 805, wherein markers are inserted into the customized event data stream to indicate the beginning and end points for a local content commercial to air. These markers may be inserted at virtually any point during the transmission of the customized data stream—at the on-site control location, the compression facility 130, the local affiliate 140, and so forth. In step 810, the receiver receives 165 the customized event data stream on its first tuner. It should be noted that "first tuner" and "second tuner," as used in this application, are terms of convenience. The tuner receiving the customized event data stream is always referred to as the first tuner, while the tuner receiving the local content commercial is always referred to as the second tuner.

Next, in step 815 the receiver 165 also receives a local content commercial data stream across its second tuner. The customized event and local content commercial data streams may be transmitted via a variety of mediums, such as across a cable network headend 150, from a satellite 120, terrestrially via broadcast turner 170, and so forth. Further, each data stream may be transmitted via the same medium or by a different medium. For example, the customized event data stream may be transmitted from a cable headend 150, while the local content commercial data stream is broadcast from an antenna 170.

In step 820, the two-tuner receiver 165 detects the marker in the customized event data stream indicating the beginning of a time slot allocated to display a local content commercial. Upon detecting the marker, the receiver 165 executes step 825 and switches the data stream displayed from the customized event data stream (received by the first tuner) to the local content commercial data stream (received by the second tuner). While the local content commercial plays, the receiver 165 continues to monitor the customized event data stream through the first tuner.

In step 830, the receiver 165 detects the marker in the customized event data stream indicating the end of the time slot allocated to display the local content commercial. In response to detecting this marker, the embodiment returns the display to the customized event data stream by switching its output from the second tuner to the first tuner in step 835. In this manner, the embodiment may present a local content commercial in the middle of a customized event data stream, despite the difficulties associated with inserting local commercials into a live national broadcast.

ALTERNATE EMBODIMENTS

Although the above embodiments have been described with respect to a televised customized event, alternate embodiments may employ the methods detailed herein with any sort of data transmission. For example, data transmissions across the Internet, an intranet, and so forth may be substituted for the customized event data stream mentioned above. Similarly, alternate embodiments may be employed with radio, infrared, or other wireless transmissions. Further, alternate embodiments may use cellular phone display screens, personal data assistants (PDAs), computer cathode ray tubes or plasma monitors, web tablets, and so forth as a display device instead of a television screen.

CONCLUSION

Accordingly, the present invention comprises a method and system capable of inserting local content commercials into a customized event data stream. This insertion may be accomplished at various points of the data transmission, depending on the embodiment. Further, the exact method of insertion may vary from embodiment to embodiment, as described above.

As will be recognized by those skilled in the art from the foregoing description of example embodiments of the invention, numerous variations on the described embodiments may be made without departing from the spirit and scope of the invention. Further, while the present invention has been described in the context of specific embodiments and processes, such descriptions are by way of example and not limitation. Accordingly, the proper scope of the present invention is specified by the following claims and not by the preceding examples.

We claim:

1. A computer-implemented method, the method comprising:
   generating a plurality of program signals associated with a customized event, the plurality of program signals corresponding to different portions of the customized event;
   creating a data stream comprising the plurality of program signals;
   from a local affiliate, inserting one or more local content commercials and corresponding suppression commands into a first program signal of the plurality of program signals in the data stream, the first program signal includes a geographic identifier stored in a service identifier (SID) corresponding to a geographic area for which each of the one or more local content commercials is intended, the geographic identifier stored in the SID being used to match a geographic identifier of a headend, program signals not containing matching geographic identifiers being suppressed; and
   transmitting the data stream to the headend, wherein a suppression command associated with the first program signal is to suppress other program signals in the data stream associated with the customized event and to enable only the first program signal including the one or more local content commercials to be viewable on a device associated with the headend.

2. The method of claim 1, wherein the suppression command associated with the first program signal is to suppress the receiver's ability to change between program signals of the plurality of programs signals corresponding to the different portions of the customized event.

3. The method of claim 2, wherein the suppression command is to permit the receiver to change between the program signals corresponding to the different portions of the customized event in response to the receiver receiving an end of commercial marker.

4. A computer-implemented method comprising:
   creating a customized event data stream comprising a plurality of program signals, the plurality of program signals corresponding to different portions of a customized event, at least one of the plurality of program signals including a geographic identifier stored in a service identifier (SID) corresponding to a particular geographic area for which a local content commercial is intended, the geographic identifier stored in the SID being used to match a geographic identifier of a headend, program signals not containing matching geographic identifiers being suppressed;
   transmitting the customized event data stream to a commercial insertion point;
   detecting a commercial marker in a secondary data stream associated with the customized event data stream;
   inserting the local content commercial into the customized event data stream at a point identified by the commercial marker; and
   inserting a suppression command associated with the local content commercial into the customized event data stream, the suppression command to instruct receivers that receive the customized data stream to prevent switching between the plurality of program signals corresponding to the different portions of the customized event during a time when the local content commercial is presented.

5. The method of claim 4, wherein the commercial insertion point is at a headend.

6. The method of claim 4, wherein the commercial insertion point is at a local affiliate.

7. The method of claim 5, wherein the secondary data stream and the customized data stream are the same.

8. The method of claim 5, further comprising:
creating the secondary data stream by multiplexing one of the plurality of program signals with the commercial marker; and
transmitting the secondary data stream separately from the customized data stream to the headend.

9. The method of claim 5, wherein the local content commercial is retrieved from a storage device collocated with the headend.

10. The method of claim 5, wherein the local content commercial is retrieved from the secondary data stream.

11. The method of claim 9 or 10, further comprising:
multiplexing the local content commercial and the customized event data stream into a remultiplexed customized event data stream; and
transmitting the remultiplexed customized event data stream to the receivers.

12. The method of claim 11, wherein said inserting the local content commercial into the customized event data stream at the point identified by the commercial marker comprises:
calculating an MPEG-4 frame differential between a frame of the customized event data stream immediately prior to the commercial marker and a first frame of the local content commercial; and
using the frame differential to seamlessly insert the local content commercial into the customized event data stream.

13. A computer-implemented method, the method comprising:
receiving a customized event data stream at a first tuner of a dual receiver, the dual receiver having the first tuner and a second tuner, the customized event data stream having a plurality of program signals each corresponding to a different portion of a customized event;
detecting a commercial marker associated with a first program signal of the customized event data stream;
inserting a local content commercial into the first program signal of the customized event data stream at a point identified by the commercial marker, the first program signal including a geographic identifier stored in a service identifier (SID) corresponding to a geographic area for which the local content commercial is intended, the geographic identifier stored in the SID being used to match a geographic identifier of a headend, program signals not containing matching geographic identifiers being suppressed; and
inserting a suppression signal associated with the local content commercial into the first program signal, the suppression signal to instruct the dual receiver to suppress one or more program signals in the customized event data stream from being presented on a display device operably connected to the dual receiver while the local content commercial in the first program signal is being presented on the display device.

14. The method of claim 13, wherein the local content commercial is broadcast using digital cable signal.

15. The method of claim 13, wherein the local content commercial is broadcast using terrestrial broadcast.

16. The method of claim 13, wherein the local content commercial is broadcast using satellite broadcast.

17. A data stream processing facility comprising:
a headend configured to execute:
a programmed component to receive a data stream comprising a plurality of multiplexed program signals, each of the multiplexed program signals containing respective supplemental content markers and each program signal corresponding to a different portion of a customized event, at least one of the program signals including a geographic identifier stored in a service identifier (SID) corresponding to a geographic area for which a local content commercial is intended, the geographic identifier stored in the SID being used to match a geographic identifier of the headend, program signals not containing matching geographic identifiers being suppressed;
a programmed component to integrate each one of a plurality of segments respectively into one of the multiplexed program signals at the supplemental content markers to generate a revised data stream, each segment comprising a geographic area identifier for a different one of the geographic areas, a suppression signal, and a content; and
a programmed component to broadcast the revised data stream, wherein a first suppression signal is to cause a receiver that receives the broadcast revised data stream to suppress presenting contents associated with segments not related to the first suppression signal, the receiver being associated with the geographic area corresponding to the geographic identifier associated with the first suppression signal.

18. The data stream processing facility of claim 17 wherein the headend is a headend in the sky (HITS).

19. A computer-implemented method of presenting a customized event to a viewer in a particular geographic area, the method comprising:
receiving a customized event data stream comprising a plurality of multiplexed program signals, at least one of the plurality of multiplexed program signals containing a respective supplemental content marker and an associated suppression signal, each program signal corresponding to a different portion of the customized event;
selecting one of the multiplexed program signals in the customized event data stream in accordance with the viewer's preference;
presenting the selected program signal to the viewer, the program signal including a geographic identifier stored in a service identifier (SID) corresponding to a particular geographic area for which a local content commercial is intended, the geographic identifier stored in the SID being used to match a geographic identifier of a headend, program signals not containing matching geographic identifiers being suppressed;
detecting the supplemental content marker in the selected program; and
in response to said detecting, presenting a supplemental content relating to the particular geographic area to the viewer while suppressing contents associated with the plurality of multiplexed program signals in the customized event data stream, the suppressing being based on a suppression signal associated with the detected supplemental content marker.

20. The method of claim 19 wherein the customized event data stream is received from a first channel, and further comprising acquiring the supplemental content relating to the particular geographic area from a second channel.

21. The method of claim 19 further comprising:
storing the supplemental content on a storage medium local to the viewer; and
acquiring the supplemental content for the displaying the supplemental content from the storage medium.

22. The method of claim 19 further comprising allowing the contents associated with the plurality of multiplexed programs in the customized event data stream to be presented to the viewer upon completion of the presenting of the supplemental content.

23. The method of claim 1, wherein the geographic identifier comprises a designated market area identifier.

24. The method of claim 1, further comprising based on the headend not matching any geographic identifiers stored in the SID of program signals, sending all SIDs comprising data for the customized event.

25. The method of claim 1, further comprising based on the headend not matching any geographic identifiers stored in the SID of program signals, selecting a default SID for transmission.

26. The method of claim 23, further comprising based on the headend not matching any geographic identifiers stored in the SID of program signals, selecting a SID having a local content commercial for a closest DMA.

* * * * *